(12) United States Patent
Nagahisa et al.

(10) Patent No.: US 6,987,528 B1
(45) Date of Patent: Jan. 17, 2006

(54) IMAGE COLLECTION APPARATUS AND METHOD

(75) Inventors: Hiroto Nagahisa, Tokyo (JP); Koji Wakimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/579,891

(22) Filed: May 26, 2000

(30) Foreign Application Priority Data

May 27, 1999 (JP) ............................... 11-148137

(51) Int. Cl.
*H04N 7/18* (2006.01)

(52) U.S. Cl. .................. 348/143; 348/135; 348/156; 348/161; 382/173

(58) Field of Classification Search .......... 348/143, 348/135, 156, 161, 155, 152, 154, 149, 701, 348/207; 382/173, 104, 107; 340/937, 529, 340/541, 506, 825; 345/168
See application file for complete search history.

(56) References Cited

U.S. PATENT DOCUMENTS

| | | | | |
|---|---|---|---|---|
| 4,257,063 A | * | 3/1981 | Loughry et al. .......... 348/155 |
| 4,653,109 A | * | 3/1987 | Lemelson et al. .......... 348/701 |
| 4,847,772 A | * | 7/1989 | Michalopoulos et al. ... 382/104 |
| 6,064,303 A | * | 5/2000 | Klein et al. ............. 340/506 |
| 2003/0044168 A1 | * | 3/2003 | Matsukawa ......... 348/207.99 |

FOREIGN PATENT DOCUMENTS

| JP | A10240774 | | 9/1998 |
|---|---|---|---|
| JP | 10240774 | * | 11/1998 |
| JP | 2000339923 A | * | 12/2000 |

* cited by examiner

*Primary Examiner*—Shawn S. An
(74) *Attorney, Agent, or Firm*—Birch, Stewart, Kolasch & Birch, LLP

(57) ABSTRACT

In an image collection apparatus an image acquisition unit acquires an image, an event detection unit detects an event, an event data creation unit creates event data indicative of at least a generation time and contents of the event detected by the event detection unit, a macro event definition unit defines a macro event including a related event group and having a time width by using the generation time and contents of the event, a macro event data creation unit creates macro event data by structurizing a plurality of event data based on definition contents of the macro event, an image recording unit records an image of a macro event corresponding to the macro event data, a retrieval unit retrieves a desirable macro event based on the macro event data, and a display unit displays the image of the macro event.

10 Claims, 26 Drawing Sheets

EVENT DATA

| 31a | 31b | 31c | 31d | 31e | 31f | 31g | 31h | 31i | 31j |
|---|---|---|---|---|---|---|---|---|---|
| EVENT ID | EVENT TYPE | EVENT LOCATION | EVENT OBJECT | EVENT TIME | CAMERA ID | IMAGE RECORDING START TIME | IMAGE RECORDING END TIME | STATIC IMAGE | DYNAMIC IMAGE |
| 1 | 2 | 3 | 11 | 19990303 11:12:23 | 1 | 19990303 11:12:13 | 19990303 11:12:53 | 1.JPG | 1.MPG |
| ... | | | | | | | | | |

FIG.6

5a MACRO EVENT
DEFINITION CONTENT

| STRUCTURIZING KEY (41a) | CONDITION ITEM NAME (41b) | ORDER VALUE (41c) | ORDER VALUE (41d) | ORDER VALUE (41e) | ORDER VALUE (41f) | ORDER VALUE (41g) |
|---|---|---|---|---|---|---|
| EVENT OBJECT | EVENT TYPE | 1 | 2 | 3 | 4 | |
| . . . | | | | | | |

FIG.8

7a  EVENT DATA

| EVENT ID | EVENT TYPE | EVENT LOCATION | EVENT OBJECT | EVENT TIME | CAMERA ID | IMAGE RECORDING START TIME | IMAGE RECORDING END TIME | STATIC IMAGE | DYNAMIC IMAGE |
|---|---|---|---|---|---|---|---|---|---|
| ... | | | | | | | | | |
| 3 | 1 | Null | 11 | 19990303 11:12:23 | 1 | 19990303 11:12:13 | 19990303 11:12:53 | 3.JPG | 3.MPG |
| ... | | | | | | | | | |
| 8 | 2 | 3 | 11 | 19990303 11:13:01 | 1 | 19990303 11:12:51 | 19990303 11:13:31 | 8.JPG | 8.MPG |
| ... | | | | | | | | | |
| 12 | 5 | 2 | Null | 19990303 11:29:14 | 1 | 19990303 11:29:04 | 19990303 11:29:44 | 12.JPG | 12.MPG |
| ... | | | | | | | | | |
| 18 | 5 | 3 | Null | 19990303 11:35:41 | 1 | 19990303 11:35:31 | 19990303 11:36:11 | 18.JPG | 18.MPG |
| ... | | | | | | | | | |
| 20 | 3 | 3 | 11 | 19990303 11:44:15 | 1 | 19990303 11:44:05 | 19990303 11:44:45 | 20.JPG | 20.MPG |
| ... | | | | | | | | | |
| 22 | 4 | Null | 11 | 19990303 11:44:51 | 1 | 19990303 11:44:41 | 19990303 11:45:21 | 22.JPG | 22.MPG |
| ... | | | | | | | | | |

FIG.9

7b MACRO EVENT DATA

| MACRO EVENT ID | CAMERA ID | EVENT OBJECT | START TIME | END TIME | DYNAMIC IMAGE | STRUCTURE EVENT ID1 | STRUCTURE EVENT ID2 | STRUCTURE EVENT ID3 | STRUCTURE EVENT ID4 | STRUCTURE EVENT ID5 |
|---|---|---|---|---|---|---|---|---|---|---|
| G1 | 1 | 11 | 19990303 11:12:13 | 19990303 11:45:21 | G1.MPG | 3 | 8 | 20 | 22 | |
| ⋮ | | | | | | | | | | |

FIG.16

15a MACRO EVENT DEFINITION CONTENT

| 61a | 61b | 61c | 61d | 61e | 61f | 61g |
|---|---|---|---|---|---|---|
| STRUCTURIZING KEY | CONDITION ITEM NAME | ORDER VALUE | ORDER VALUE | ORDER VALUE | ORDER VALUE | ORDER VALUE |
| EVENT OBJECT | EVENT TYPE | 1 : | 2 : | 3 : 5 | 4 : | |
| . . . | | | | | | |

FIG.18

17b MACRO EVENT DATA

| MACRO EVENT ID | CAMERA ID | EVENT OBJECT | START TIME | END TIME | DYNAMIC IMAGE | STRUCTURE EVENT ID1 | STRUCTURE EVENT ID2 | STRUCTURE EVENT ID3 | STRUCTURE EVENT ID4 | STRUCTURE EVENT ID5 |
|---|---|---|---|---|---|---|---|---|---|---|
| G1 | 1 | 11 | 19990303 11:12:13 | 19990303 11:45:21 | G1.MPG | 3 | 8 | 12 | 18 | 20 |
| ... | | | | | | | | | | |

| STRUCTURE EVENT ID6 | STRUCTURE EVENT ID7 | STRUCTURE EVENT ID8 | STRUCTURE EVENT ID9 | STRUCTURE EVENT ID10 |
|---|---|---|---|---|
| 22 | | | | |
| | | | | |

TABLE : CAMERA ID=1

| TIME | LATITUDE | LONGITUDE | DIRECTION |
|---|---|---|---|
| 19990303101012 | 128.1240 | 38.2101 | 123.11 |
| 19990303101013 | 128.1350 | 38.2211 | 123.23 |
| ... | | | |

TABLE : CAMERA ID=2

| TIME | LATITUDE | LONGITUDE | DIRECTION |
|---|---|---|---|
| 19990308123041 | 135.5223 | 37.3445 | 4.98 |
| 19990308123042 | 135.5510 | 37.3690 | 5.11 |
| ... | | | |

FIG.29

Q1 STREAM DATA INDEX INFORMATION

| EVENT ID | TYPE | RECORDING TIME DURATION | | | CODING | | | INPUT DEVICE | | LOCAL DEVICE |
|---|---|---|---|---|---|---|---|---|---|---|
| | | TIME | BEFORE THE EVENT | AFTER THE EVENT | METHOD | RATE | SIZE | ID | TYPE | |
| Ev003 | Ty5 | 96.12.25 12:25:05 | 300 s | 300 s | MJPEG | 30f/s | 640×480 | Dev081 | Cam | Loc08 |
| Ev003 | Ty5 | 96.12.25 12:25:05 | 300 s | 300 s | MJPEG | 30f/s | 320×240 | Dev032 | Cam | Loc03 |
| Ev006 | Ty3 | 96.12.25 12:43:20 | 300 s | 300 s | MPEG2 | 30f/s | 640×480 | Dev101 | Cam | Loc10 |
| ... | | | | | | | | | | |

IMAGE COLLECTION APPARATUS AND METHOD

FIELD OF THE INVENTION

The present invention relates to an image collection apparatus and method to be used for monitoring the vicinity of a place such as a parking lot, a bank, a convenience store, a road side or the like where an image acquisition apparatus such as a video camera is installed or for delivering image information by means of the image acquisition apparatus. More specifically, this invention relates to an image collection apparatus capable of rapidly retrieving and displaying a desirable one of the images to quickly investigate the cause of an accident or a crime or of rapidly analyzing the state of the vicinity of the installation place based on the image.

BACKGROUND OF THE INVENTION

In recent years, the image collection apparatus for collecting and monitoring an image of an installation place which is picked up by the installed video camera or the like has been increasingly required according to the necessity. As a conventional prior art related to such an image collection apparatus, for example, Japanese Patent Application Laid-Open No. 10-240774 discloses a data collection method and monitoring apparatus. In this apparatus, images of an event are stored just before and after the time at which the event is generated. Thus, a lot of events can be stored even if the storage capacity is small. The conventional image collection apparatus will be explained below with reference to the this apparatus.

FIG. 28 is a block diagram showing the entire structure of the conventional image collection apparatus. A plurality of local devices 101, a plurality of center devices 102, and a data management device 103 are connected to each other through a network 105 and can mutually transmit and receive information. The local devices 101 are placed at places that are to be monitored. The center devices 102 are placed at a place where a supervisor (a person who is authorized to monitor) is present. A display device 106 is provided to each center device 102, which can display the image information or reproduce voice information for the supervisor. The local device 101 has a video camera, which acquires image information and voice information. The local device 101 stores the acquired information in a storage device 104. The data management device 103 intensively manages stream index information about the location of information (stream data) recorded in a media on the network 105, for example, the storage device 104. The center device 102 retrieves the stream data index information based on certain retrieval conditions, obtains the result of retrieval for the location of the stream data to know the location of the stream data satisfying the retrieval conditions and collects stream data satisfying the retrieval conditions from the media.

A data input unit 107 digitizes the acquired image information and voice information. The image information is coded into MJPEG (Motion Joint Photographic Coding Experts Group) or MPEG (Motion Picture Experts Group) and the voice information is coded into PCM (Pulse Code Modulation) and ADPCM (Adaptive Differential Pulse Code Modulation). An input data storage and read unit 108 stores the coded data as timely continuous stream data in the storage device 104. In addition, the input data storage and read unit 108 transmits the stored stream data through a communication unit 109 and the network 105 according to a request from the center device 102 through the network 105.

In this case, the input data storage and read unit 108 generates stream data index information causing the input image information and voice information to correspond to the generated event, and stores the stream data index information in the storage device 104 and transmits the same to the data management device 103. In the case in which desirable image information or the like is fetched as described above, the stream data index information stored in the data management device 103 is used.

The input data storage and read unit 10B stores, as event information, the stream data on the image information and the voice information for only a predetermined time before and after the generation of the event. For instance, FIG. 29 shows an example of the stream data index information. As shown in the column of recording time duration in the stream data index information D1, image of the event 300 seconds before the generation of the event and 300 seconds after the generation of the event is stored. The stream data index information D1 includes event ID, type of the event, information about coding, information about the input device and the local device which picked the image, and the like.

FIG. 30 is a diagram showing the recording state of an event image corresponding to the stream data retrieval information D1 in FIG. 29. Three local devices Loc03, Loc08 and Loc10 independently pick up images and record, as event images 111a to 111c, 300 seconds before and after the time at which an event is generated on the time base of each of all picked up images 112a to 112c. More specifically, the local devices Loc03 and Loc08 store the event images 111a and 111b at the same time for an event having an event ID of Ev003. For an event having an event ID of Ev006 generated later, the local device Loc10 stores the event image 111c. Thus, only images picked up before and after the time of the event generation are stored. Consequently, even if the storage device 104 has a limited storage capacity, a lot of information can be stored. An event here means an event occurring instantly and does not have a time width. The same definition holds in the following description.

However, the conventional image collection apparatus stores the image picked up for a predetermined time mainly including the time at which an event is generated. Thus, individual event images are stored independently of other event images. If a group of related events is to be retrieved, a lot of time is required for the retrieval operation. Even if it is considered that the retrieval operation does not require long time, it is difficult to grasp the relationship of the events in the group on a time basis. Thus, there is a disadvantage that it requires time and labor to carry out the monitoring or analysis.

These problems are explained in detail with respect to FIG. 31 and FIG. 32. FIG. 31 shows the relationship between an event image including a series of related event images and an event. In the whole image 112 in FIG. 31, five events of entry into and leaving from a room, that is events 121 to 125 (event ID: 1 to 5), are generated and event images 113 to 117 are recorded corresponding to the events 121 to 125. Accordingly, when events are retrieved with the type of the event as "entry", for example, the event images 121, 122 and 124 can be fetched and referred.

Consider, as shown in FIG. 32, that the events 121 and 123 correspond to entry and leaving of the same employee (employee No. 122). In this case, it is impossible to refer to a macro event image 141 corresponding to a bigger event (which will be hereinafter referred to as macro event) which is an event having a time width the vicinity of a time including the time of the generation of the event 121 at which this employee enters the room to the vicinity of a time including the time of the generation of the event 122 at which this employee leaves the room. Similarly, consider that the events 122 and 125 correspond to entry and leaving of different employee (employee No. 155). In this case, it is impossible to refer to a macro event image 142 corresponding to a macro event having a time width from the vicinity of a time including the time of the generation of the event 122 at which this employee enters the room to the vicinity of a time including the time of the generation of the event 125 at which this employee leaves the room.

SUMMARY OF THE INVENTION

It is an object of this invention to obtain an image collection apparatus and method capable of rapidly retrieving and displaying a desirable image without a labor by automatically collecting an image within a time at which a related event group is generated and of monitoring and analyzing the state of an image pick-up site based on the collected image rapidly and easily.

In order to achieve the above-mentioned object, according to one aspect of the present invention, an image acquisition unit acquires an image, a event detection unit detects an event, and a event data creation unit creates event data indicative of at least a generation time and contents of the event detected by the event detection unit. A macro event definition unit which defines a macro event including a related event group and having a time width by using the generation time and contents of the event, a macro event data creation unit creates macro event data by structurizing a plurality of event data based on definition contents of the macro event, and an image recording unit records an image of a macro event corresponding to the macro event data. A retrieval unit retrieves a desirable macro event based on the macro event data, and a display unit acquires at least an image of the macro event retrieved by the retrieval unit from the image recording unit and displays the image.

The apparatus further comprises a temporary storage unit which temporarily stores the image acquired by the image acquisition unit, the image recording unit extracting and recording an image related to an event detected by the event detection unit from the image temporarily stored by the temporary storage unit.

Further, a macro event definition unit carries out definition including repetition of a predetermined event in a series of events constituting the macro event and the macro event data creation unit creates macro event data in accordance with the definition contents.

The apparatus further comprises an image summary unit which selects an image in a predetermined portion of the image of the macro event and summarizes the image of the macro event, the image recording unit recording the image of the macro event summarized by the image summary unit.

The apparatus further comprises an image summary unit which selects an image in a predetermined portion of the image of the macro event, periodically acquires a static image from a non-selected image of the macro event and connects the selected image with the static image on a time basis, thereby summarizing the image of the macro event, the image recording unit recording the image of the macro event summarized by the image summary unit.

Further, the image summary unit selects an image in a predetermined portion of the image of the macro event, periodically acquires a static image from a non-selected image of the macro event and connects the selected image with the static image on a time basis, thereby summarizing the image of the macro event, the image recording unit recording the image of the macro event summarized by the image summary unit, and particularly, intermittently interpolating the images selected by the static image.

Further, the measurement unit measures data related to the image, and the measured data storage unit stores the measured data acquired by the measurement unit in relation to the macro event, the display unit displaying the image of the macro event and displaying the measured data related to the macro event, thereby supporting to understand the contents of the image of the macro event.

The apparatus further comprises a plurality of image acquisition devices, the image recording unit selecting one of the image acquisition units corresponding to the image of the macro event from a plurality of images input from the image acquisition unit and recording, as the image of the macro event, the image input from the selected image acquisition unit.

The apparatus further comprises an analysis unit, which carries out a predetermined analysis processing based on at least the image of the macro event.

According to another aspect of the present invention, an image is acquired and an event is detected at an acquiring step, event data indicative of at least a generation time and contents of the event detected at the acquiring step are created at a event data creating step, macro event data are created by structurizing a plurality of event data generated by the event data generation unit based on macro event definition contents defining a macro event including a related event group and having a time width at a macro event data creating step, an image of a macro event corresponding to the macro event data is recorded at a image recording step, a desirable macro event is retrieved based on the macro event data at a retrieving step, and at least the image of the macro event retrieved at the retrieving step is acquired and displayed at a displaying step.

The method further comprises a temporary storing step of temporarily storing the image acquired at the acquiring step, the image recording step extracting and recording an image related to an event detected at the acquiring step from the image temporarily stored at the temporary storing step.

Further, the macro event creating step creates macro event data based on the macro event definition contents defined including repetition of a predetermined event in a series of events constituting the macro event.

The method further comprises an image summarizing step of selecting an image in a predetermined portion of the image of the macro event and summarizing the image of the macro event, the image recording step recording the image of the macro event summarized at the image summarizing step.

The method further comprises an image summarizing step of selecting an image in a predetermined portion of the image of the macro event, periodically acquiring a static image from a non-selected image of the macro event and connecting the selected image with the static image on a time basis, thereby summarizing the image of the macro event, the image recording step recording the image of the macro event summarized at the image summarizing step.

The method further comprises a measuring step of measuring data related to the image, and a measured data storing step of storing the measured data acquired at the measuring step in relation to the macro event, the displaying step displaying the image of the macro event and displaying the measured data related to the macro event.

Further, the image recording step selects one of the images corresponding to the image of the macro event from a plurality of input images and records the selected image as the image of the macro event.

Other objects and features of this invention will become apparent from the following description with reference to the accompanying drawings.

BRIEF DESCRIPTION OF THE DRAWINGS

FIG. 6 is a diagram showing the specific example of macro event definition contents according to the first embodiment;

FIG. 8 is a diagram showing the specific example of event data including an event to be used for the structure of the macro event;

FIG. 9 is a diagram showing the specific example of macro event data;

FIG. 16 is a diagram showing the specific example of macro event definition contents according to the second embodiment;

FIG. 18 is a diagram showing the specific example of macro event data according to the second embodiment;

FIG. 29 is a diagram showing the specific example of stream data index information created by the conventional image collection apparatus;

DESCRIPTION OF THE PREFERRED EMBODIMENTS

Preferred embodiments of an image collection apparatus and an image collection method according to the present invention will be described below in detail with reference to the accompanying drawings.

First Embodiment

Figure 1:
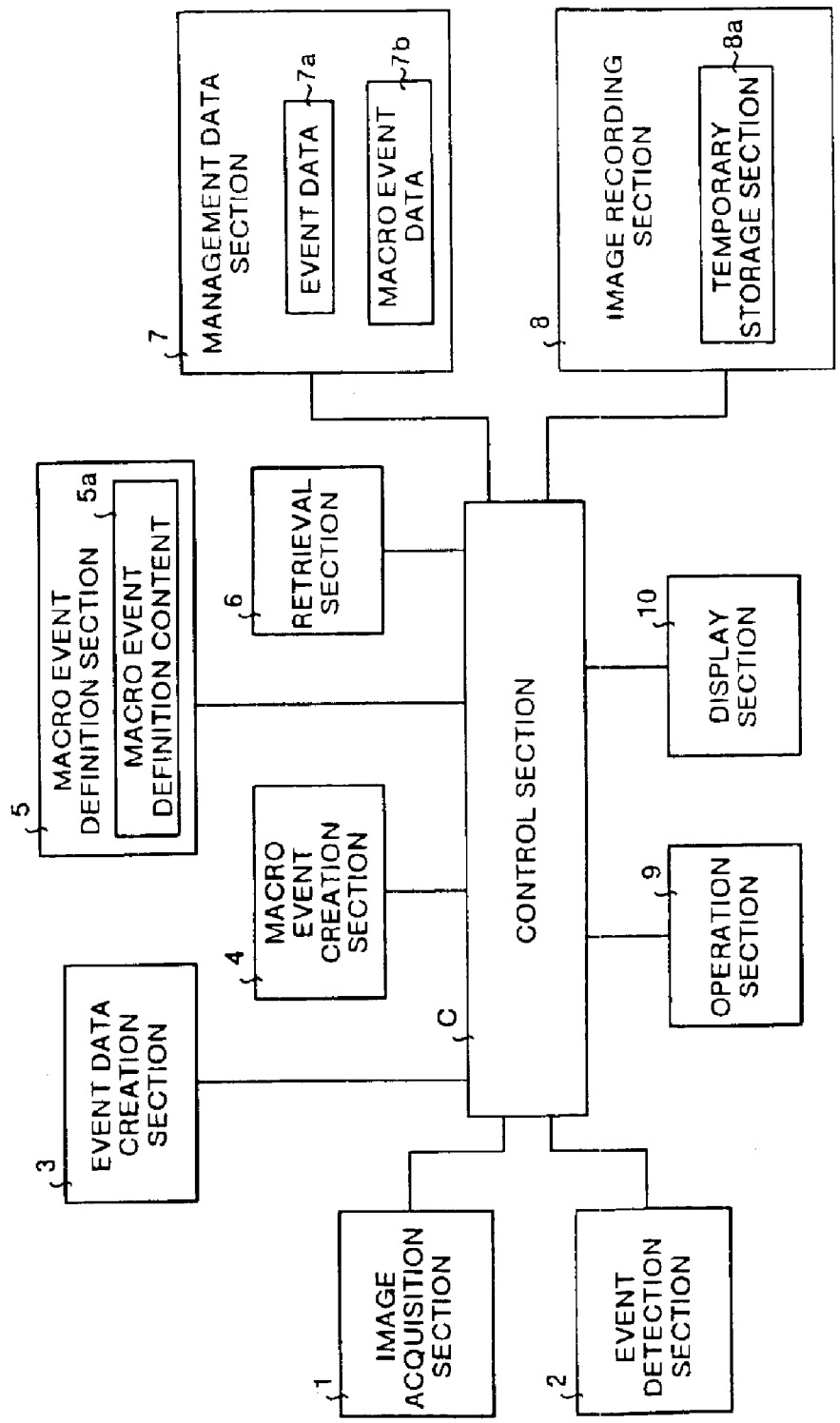
FIG. 1 is a block diagram showing a complete structure of an image collection apparatus according to a first embodiment of the present invention.

A first embodiment of the present invention will be described below. FIG. 1 is a block diagram showing the whole structure of an image collection apparatus according to the first embodiment of the present invention. In FIG. 1, an image acquisition section 1 is implemented by a video camera or the like and serves to pick up the image of a predetermined subject and to transmit the picked up image to a control section C. An event detection section 2 serves to detect an event generated in relation to the image acquired by the image acquisition section 1 and to transmit information about the detected event to an event data creation section 3 through the control section C.

The event data creation section 3 serves to create event data based on information about the event detected by the event detection section 2, that is, information about an event such as a time at which the event is generated, the type of the event and the like. A macro event creation section 4 serves to create macro event data which is obtained by structuring a plurality of event data created by the event data creation section 3. A macro event definition section 5 has macro event definition contents 5a which define a structured model to be referred when the macro event creation section 4 is to create the macro event data.

A management data section 7 serves to hold and manage event data 7a created by the event data creation section 3 and macro event data 7b created by the macro event creation section 4. An image recording section 8 serves to record an event image corresponding to the event data created by the event data creation section 3 and to record a macro event image corresponding to the macro event data created by the macro event creation section 4. The image recording section 8 has a temporary storage section 8a. The temporary storage section 8a serves to continuously and temporarily record the image acquired by the image acquisition section 1, and to erase the temporarily recorded image after a predetermined time.

A retrieval section 6 serves to specify a retrieval object based on the event data 7a or the macro event data 7b which is managed by the management data section 7 and to fetch, from the image recording section 8, an image to be the specified retrieval object. An operation section 9 is implemented by a keyboard or a pointing device which inputs various operations, and serves to input the macro event definition contents 5a, retrieval conditions and the like. A display section 10 implements a graphical user interface which is integral with the operation section 9 and serves to display and output the contents retrieved by the retrieval section 6, particularly, the retrieved image. The control section C serves to connect the above-mentioned sections and to control the whole apparatus.

Although only one image acquisition section 1 and only one event detection section 2 are shown in FIG. 1, a plurality of image acquisition sections 1 and a plurality of event detection sections 2 may be provided in this image collection apparatus. The number of the acquisition sections 1 and the event detection sections 2 is optional. That is, one acquisition section may be provided with respect to plural event detection sections, or plural acquisition sections may be provided with respect to one event detection section, or plural acquisition sections may be provided with respect to plural event detection sections.

Figure 2:
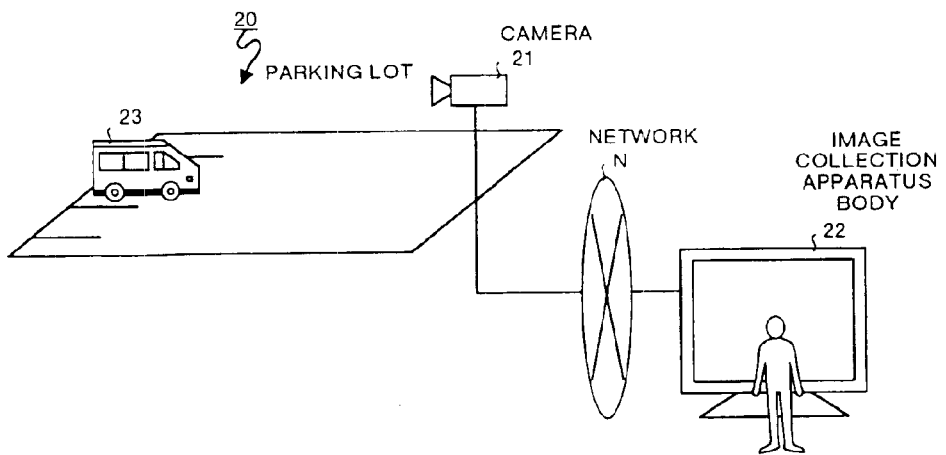
FIG. 2 concretely shows the arrangement of the image collection apparatus according to the first embodiment

FIG. 2 concretely shows the arrangement which implements the image collection apparatus according to the first embodiment. Here, the image collection apparatus shown in FIG. 1 is applied as an apparatus for monitoring (monitor apparatus) a parking lot. A camera 21 corresponds to the image acquisition section 1 and serves to pick up the contents of an image in a predetermined region in a parking lot 20, for example, the image of the parking of a car 23 for the predetermined region and to transmit the image to a partial image collection apparatus 22 through a network N. The partial image collection apparatus 22 which comprises and houses all the components of the image collection apparatus shown in FIG. 1 except the image acquisition section 1. The partial image collection apparatus 22 is implemented by a computer or the like. The image picked up by the camera 21 may be a dynamic image and/or a static image. The camera 21 may collect voice information along with the image information. Although the event detection section 2 is included in the image collection apparatus body 22 to detect an event based on a change in the contents of the image picked up by the camera 21 and the like, a sensor may be provided in the parking lot 20 to detect an event.

Figure 3:
FIG. 3 shows the structure and specific example of event data.

The operation of each section in the image collection apparatus shown in FIG. 1 will be described below considering as an example a case in which the parking lot 20 shown in FIG. 2 is monitored. FIG. 3 shows an example of the event data 7a created by the event data creation section 3. As shown in this figure, the event data 7a includes data corresponding to each of items such as event ID 31a, event type 31b, event location 31c, event object 31d, event time 31e, camera ID 31f, image recording start time 31g, image recording end time 31h, static image 31i and dynamic image 31j.

The event ID 31a is a serial number provided to a series of events detected by the event detection section 2. The event ID shown in FIG. 3 is 1, and it is apparent that the event is the first one that is detected by the event detection section 2. The event type 31b indicates the type of the event. The event type 31b is represented by numerals.

Since this example explains monitoring operation of the parking lot, following conditions are assumed for convenience. Let event type "1" denotes "car entry (into the parking lot)". That is, this event type means that a car enters into the image (precisely, into an image pick-up region). Let event type "2" denotes "car parking (into the parking lot)". That is, this event type means that the car stands still in the image. Let event type "3" denote "car departure (from the parking lot)" That is, this event type means that that was standing still in the image starts to move. Let event type "4" denote "car leaving (from the parking lot)". That is, this event type means that the car which was in the image disappears from the image. Finally, let event type "5" denote "person entry". That is, this event type means that a person enters the image. The event type in FIG. 3 is "2". This means that the event corresponding to the event data 7a is "car parking". The event type 31b is determined by the event detection section 2 by detecting the change in the data for the pixels in the image.

Figure 4:
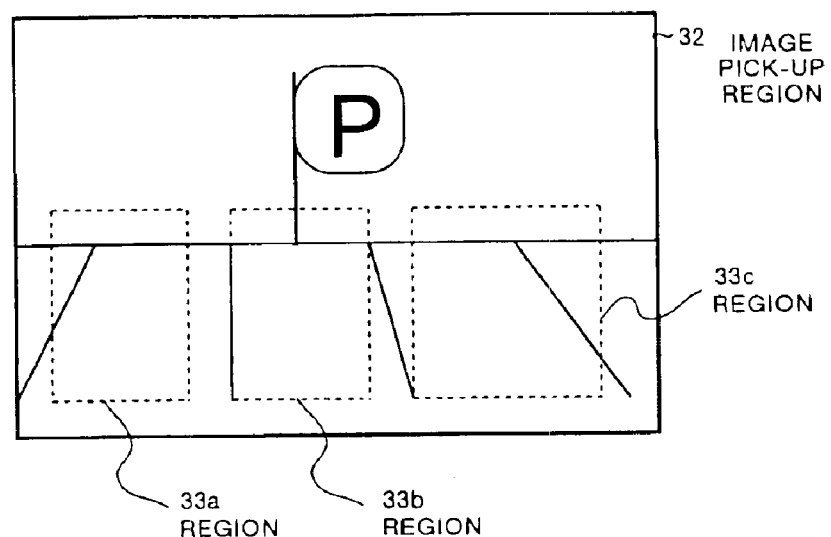
FIG. 4 explains the relationship between the image pickup region of an image acquisition section and a region, which detects an event.

The event location 31c indicates the place where the event takes place. More specifically, the event location 31c is a parking region in the parking lot and corresponds to the number of the parking region. FIG. 4 is an example of an image of a image pick-up region 32 picked by the image acquisition section 1. As shown in this figure, the image pick-up region 32 includes regions 33a to 33c which are parking regions for three cars in a parking lot. Assume that the event location corresponding to the regions 33a, 33b, and 33c are "1", "2", and "3", respectively. The event location in FIG. 3 is "3". This means that, the event "car parking" is generated in the region 33c.

The event detection section 2 determines the event location, in the same manner when detecting the event type, depending on whether the data for the pixels in any of the regions 33a to 33c in the image (image pick-up region) has changed. The event detection section 2 writes a data having meaning as the event location 31c only when the event type 31b is "2" (car parking), "3" (car departure) or "5" (person entry). The event detection section 2 writes data having meaning (that is, "null") as the event location 31c when the event type 31b is "1" (car entry) and "4" (car leaving). "null" is written as the event type 31b because it is hard to decide whether the event is detected in any of the regions 33a to 33c.

An event object 31d is a serial number provided to the object which performs the event. In this example, the event object 31d is the car. The car is identified from the number on the number plate of the car. The car number is identified by the event detection section 2 as follows. The event detection section 2 tracks a movement region on the picked up image when the event is detected, detects a number plate based on the image in the tracked movement region, reads the number on the detected number plate by image recognition, identifies that the car is an event object having the same serial number if there is the same serial number as the read number, and gives a novel serial number if the number on the number plate is new.

If the technology of image recognition is used for identifying the event object, because it is complicated, a lot of time is disadvantageously required. To overcome this problem, for example, the event object may be identified by recognizing the color of the event object. The objects having same color are provided with identical event object 31d. The objects having different color are provided with a unique event object 31d. The car may be recognized in a different manner. For example, a transmitter that transmits the ID of each car itself may be mounted in the car. In such a case, the event detection section 2 may be constructed so as to receive the ID transmitted from the car, and recognize the car based on this ID of the car.

An event time 31e is a time at which the event detection section 2 detects an event. The event time shown in FIG. 3 is "19990303 11:12:23". This means that the event is generated on Mar. 3, 1999, at 11 o'clock, 12 minutes, 23 seconds. The camera ID 31f serves to specify the camera 21 in the case in which a plurality of image acquisition sections 1, that is, a plurality of cameras 21 are used, by which it is possible to know a place where the camera 21 picking up an image to be acquired is provided.

The image recording start time 31g is a time when the image pick up is started, as shown in FIG. 3, it is 10 seconds earlier with respect to the event time 31e. The image recording end time 31h is a time when the image pick up is terminated, as shown in FIG. 3, it is 30 seconds after the event time 31e. These relative times, that is, 10 seconds and 30 seconds are previously set as common parameters for all the event.

The static image 31i indicates the type of a static image acquired at the event time 31e. In FIG. 3 the static image 31i is "1.JPG". This means that, the static image is recorded by JPEG method. Thus, the static image 31i is referred during reproduction. The recorded static image is used as a thumb nail of the generated event as will be described later. The dynamic image 31j indicates the type of a dynamic image recorded in the image recording section 8. In FIG. 3 the dynamic image 31j is "1.MPEG". This means that, the dynamic image is recorded by MPEG method. Thus, the dynamic image 31j is referred during the reproduction.

The relationship between the event data created by the event data creation section 3 and the image to be recorded in the image record section 8 will be explained here by referring to FIG. 5. A whole image 34 acquired by the image acquisition section 1 is sequentially stored in the temporary storage section 8a of the image record section 8. When the event data corresponding to the event 35 is created by the event data creation section 3, the image recording section 8 records a static image at the event time of the event 35 and an event image 36 obtained by extracting an image from the temporary storage section 8a from the image recording start time to the image recording end time. Thus, only the event image 36, shown with blacked out sections, which is only a portion of the whole image 34 is recorded in the image record section 8. When a specific period of time elapses, a portion of the whole image 34 other than the blacked out portion is erased.

Figure 5:
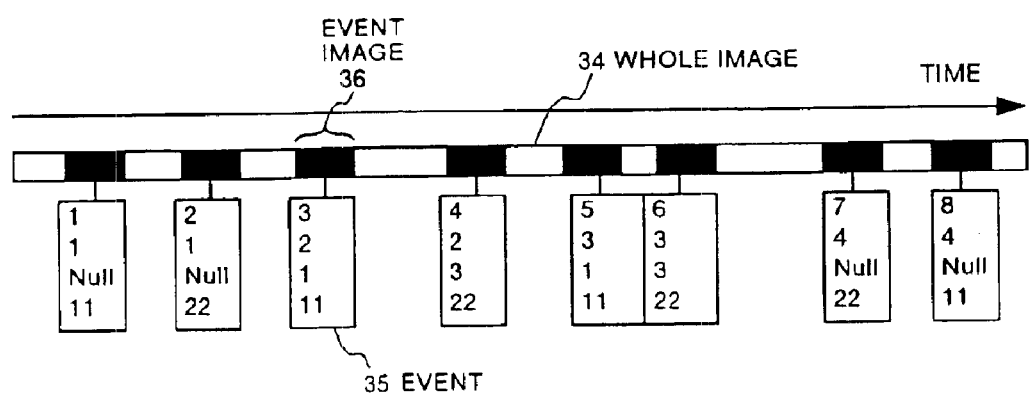
FIG. 5 explains the relationship between the whole image, an event and an event image.

As shown in FIG. 5, each event 35 contains the event data indicative of event ID, event type, event location and event object from the top in the drawing. One event 35 corresponds to one event image 36. Accordingly, the retrieval section 6 can retrieve an image by before and after the time at which each event 35 is generated by searching the event data 7a. The retrieved image can then be output to and displayed on the display section 10.

The macro event creation section 4 structures events related to each other from a plurality of event data created by the event data creation section 3 based on the macro event definition contents 5a defined by the macro event definition section 5, thereby creating macro event data 7b. The macro event definition contents 5a are models of the structure of the event and are conditions for creating the macro event data. FIG. 6 shows an example of the macro event definition contents 5a. This macro event definition contents 5a have items such as a structurizing key 41a, a condition item name 41b and order values 41c to 41g.

The structurizing key 41a is an item which should be common to each event when the event is to be structurized. In FIG. 6, the structurizing key 41a is "event object" 31d that corresponds to the event data 7a. This means that, the event related to a car having the same number (that is, the number on the number plate) is to be structurized. The condition item name 41b defines an item to be an order condition for structurizing the common event defined by the structurizing key 41a. In FIG. 6, the condition item name 41b is "event type" 31b that corresponds to the event data 7a. Each of the order values 41c to 41g represent an order value and these are preset. The macro event is defined by the event type having the order set in the order values 41c to 41g.

In FIG. 6, four order values 41c to 41f are defined, and values "1" to "4" of the event type 31b are sequentially defined. Assuming that an event previously corresponding to the event type 31b is basically generated in order of the values of "1" to "4", the value of the event type 31b is set. Therefore, well-ordered values 41c to 41f are sequentially defined. Depending on the order of the generation of the event, these order values 41c to 41g are optionally defined. For example, the event type of the "car entry" is currently set to "1" and the event type of the "car parking" is currently set to "2". In the case in which the event type of the "car entry" is set to "2" and that of the "car parking" is set to "1", the order values 41c, 41d, 41e, 41f will be defined as "2", "1", "3", "4" respectively.

Figure 7:
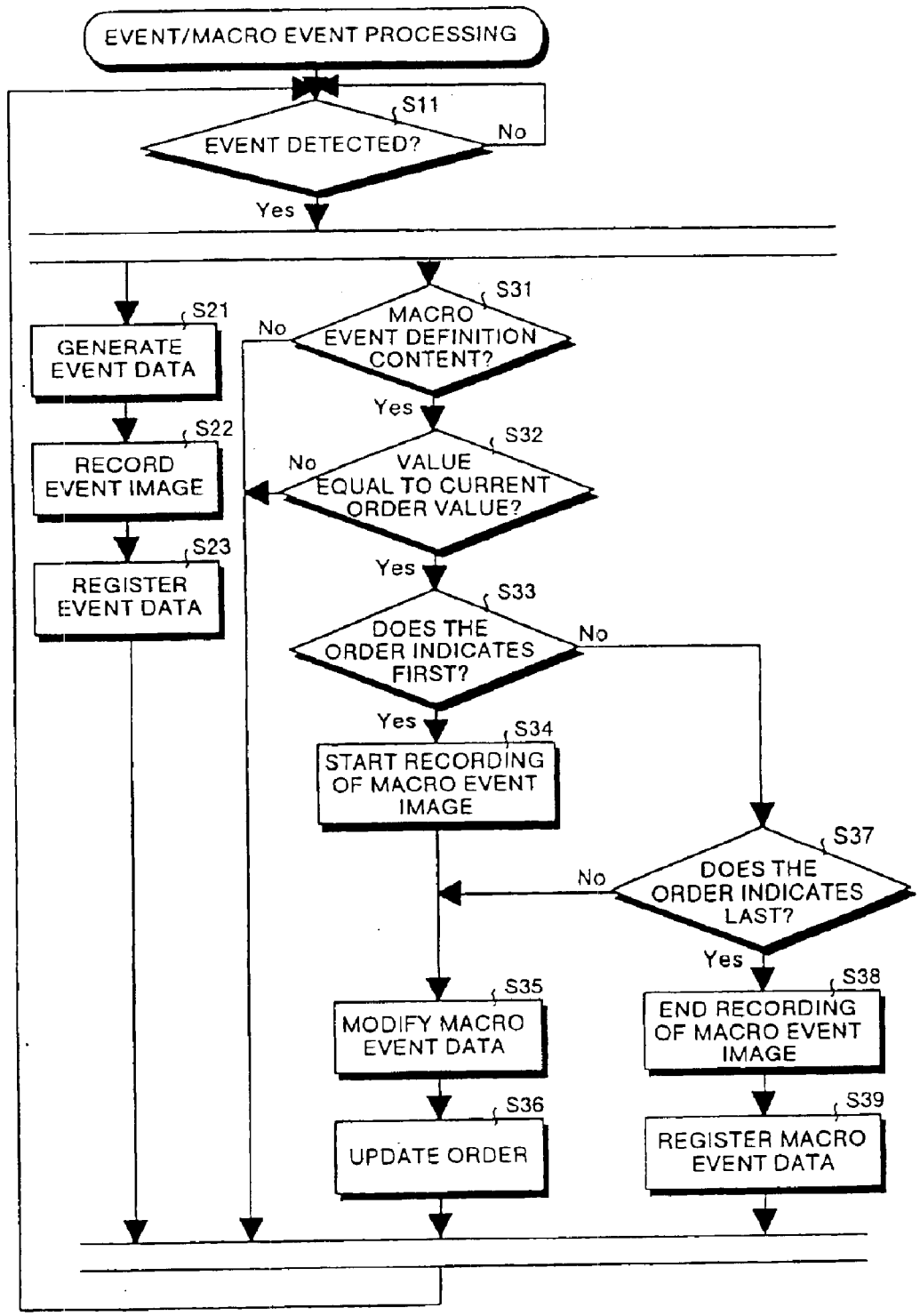
FIG. 7 is a flowchart showing the control procedure for an event processing and a micro event processing which are carried out by a control section of the image collection apparatus according to the first embodiment.

Event processing and a macro event processing (event/macro event processing) which are carried out by the control section C will be described here with reference to the flowchart shown in FIG. 7. As shown in FIG. 7, when an event is detected by the event detection section 2 (Step S11), the control section C carries out the event processing of Steps S21 to S23 and the macro event processing of Steps S31 to S39 in parallel and repeats this processing each time the event is detected.

In the event processing, the event data creation section 3 generates event data based on information about the event detected by the event detection section 2 (Step S21). Further, the event data creation section 3 records an event image corresponding to the event data in the image recording section 8 (Step S22). Thereafter, the event data generated at the Step S21 is registered as the event data 7a in the management data section 7 (Step S23). The process then returns to the Step S11.

In the macro event processing, it is decided whether or not the detected event has the contents defined as the macro event definition contents 5a (Step S31). More specifically, the decision whether or not the detected event has the macro event definition contents 5a implies the decision whether or not the event object of the structurizing key 41a is identical. If the detected event does not have the macro event definition contents 5a (Step S31, NO), the process returns to the step S11 where the detection of a next event is waited. If the detected event has the macro event definition contents 5a (Step S31, YES), it is decided whether or not the detected event type has the same value as the current order value of the event type to be the condition item name 41b (Step S32). If the event type does not have a value same as the current order value (Step S32, NO), it indicates that this particular event is not related to the macro event at all. Therefore, the process returns to the Step where the detection of a next event is waited. If the event type has a value same as the current order value (Step S32, YES), it is decided whether or not the current order value indicates first in the order (Step S33).

If the current order value indicates first order (Step S33, YES), for example, when the current order has a value shown in column of the order value 41c in FIG. 6, the recording of a macro event image is started at 10 seconds before the event time of the detected event (Step S34) and a continuous macro event image is recorded in the image recording section 8. Then, the macro event data at the current point is modified (Step S35) and the current order is further updated (Step S36). Then, the process returns to the Step S11 where the detection of a next event is waited.

On the other hand, if the current order value does not indicate the first order (Step S33, NO), it is further decided whether or not the current order value indicates the last order (Step S37). If the current order value indicates the last order (Step S37, YES), for example, when the current order has a value shown in column of the order value 41e in FIG. 6, the recording of the macro event image which is being recorded is terminated after 30 seconds since the detected event time (Step S38) and the modified macro event data are registered as the macro event data 7b in the management data section 7 (Step S39). Then, the process returns to the Step S11 where the detection of a next event is waited. If the current order value does not indicate the last order (Step S37, NO), the macro event data at the current point is modified (Step S35) and the order is further updated (Step S36). The process returns to the Step S11 where the detection of a next event is waited. In this manner, the event data and the event image are recorded and the macro event data and the macro event image are recorded.

The specific relationship between the event data and the macro event data will be explained here with reference to FIG. 8 to FIG. 10. FIG. 8 shows an example of the event data including an event to be the object of the macro event data. FIG. 9 shows an example of the macro event data created corresponding to the event data shown in FIG. 8. This macro event data is created based on the macro event definition contents 5a shown in FIG. 6. The macro event data 7b shown in FIG. 9 is created based on event data having an event object of "11" and the order value of the event type of "1"-"2"-"3"-"4". In other words, the macro event data 7b is created from the event data having an event ID of "3", "8", "20" and "22" in the event data 7a shown in FIG. 8.

In FIG. 9, a macro event ID is a serial number provided to each of the created macro event. The macro event ID provided to the macro event shown in FIG. 9 is "G1". A camera ID indicates the ID of a camera which is related to the detection of an event constituting the macro event and implies a camera for picking up the macro event image. An event object indicates an object of the event constituting the macro event. According to the macro event definition contents 5a shown in FIG. 6, the structurizing key 41a is the "event object". Therefore, the event constituting the macro event has all the same event objects.

Start time indicates a time at which recording of the image of a first event constituting the macro event is started. This start time is identical to an image recording start time in the event data having an event ID of "3". End time indicates a time at which recording of the image of a last image constituting the macro event is ended. The end time is identical to the image recording end time in the event data having an event ID of "22". The item of a dynamic image shows the name given to the macro event image. Structure event IDs ID1 to ID5 indicate the event ID constituting the macro event and the number of the structure event IDs can be set as desired.

Figure 10:
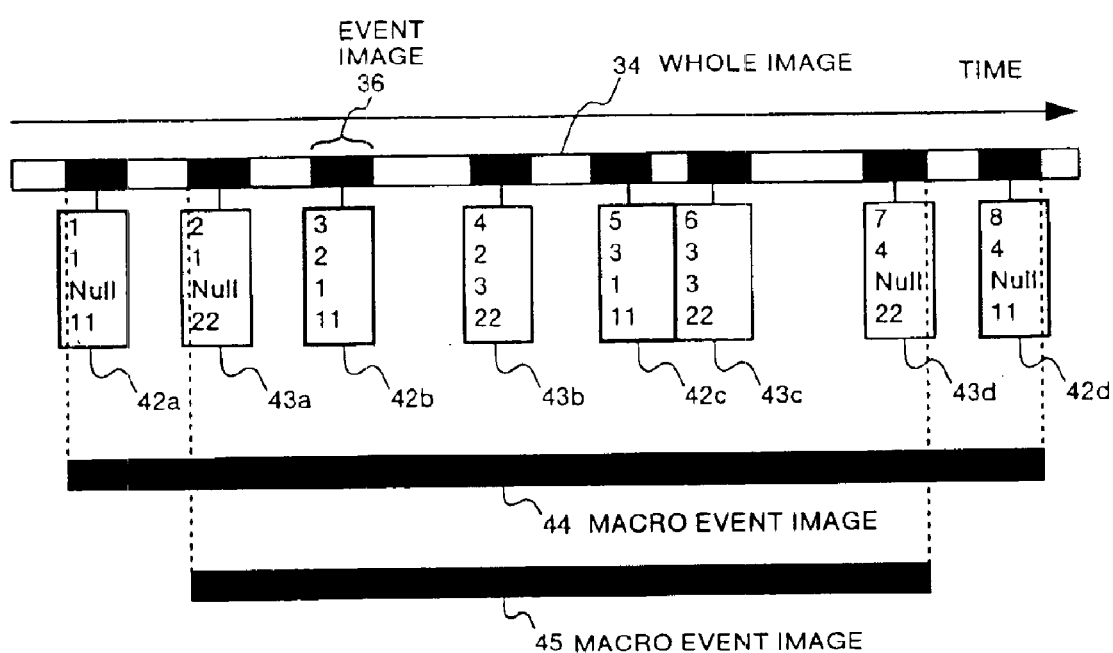
FIG. 10 explains the relationship between an event, a whole image, an event image and a macro event image.

FIG. 10 shows the relationship between the event and the macro event. The images of events 42a to 42d and 43a to 43d which are obtained before and after the event generation time for the event corresponding thereto are recorded in the image recording section 8.

The events 42a to 42d have the same event object "11" and the event type has order values of "1" to "4". Accordingly, the events 42a to 42d constitute the macro event, and a macro event image 44 is recorded in the image recording section 8. The events 43a to 43d have the same event object of "22" and the event type has the event values of "1" to "4". Accordingly, the events 43a to 43d constitute the macro event and a macro event image 45 is recorded in the image recording section 8. Consequently, an image in a portion which is originally lost is advantageously monitored, recorded and managed efficiently.

Figure 11:
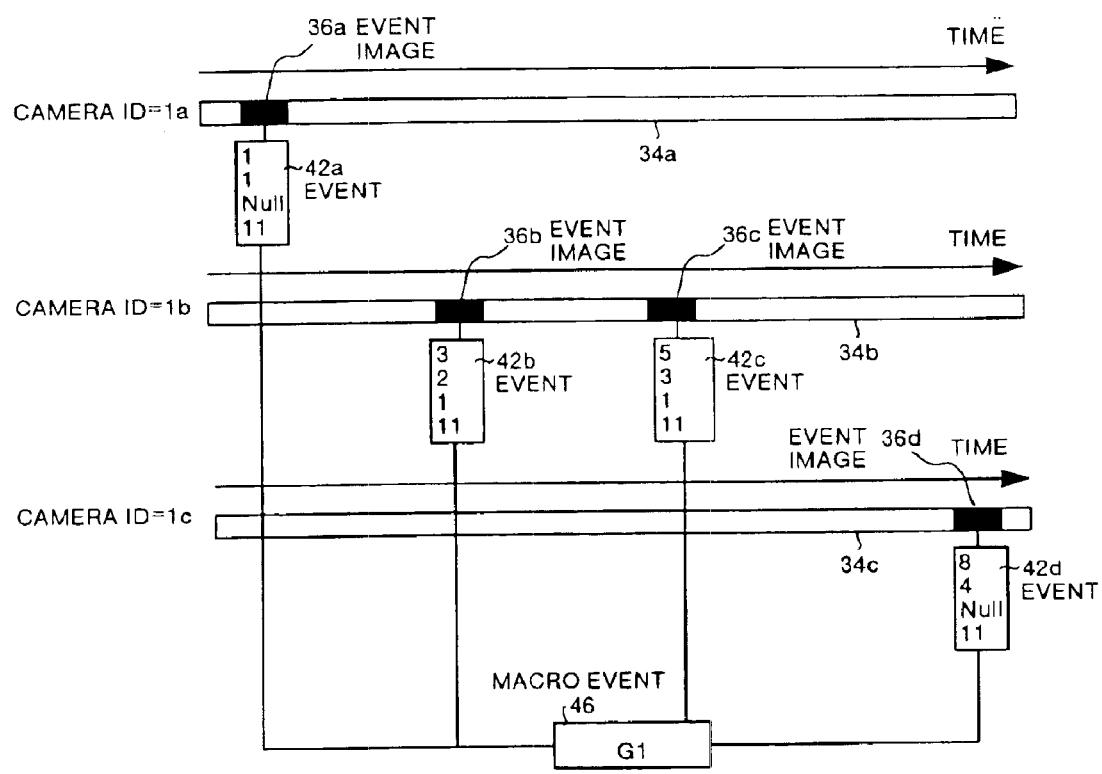
FIG. 11 is a diagram showing the relationship between an event and a macro event, which is obtained when a plurality of image acquisition sections, are provided.

It is also possible to obtain one macro event image from a plurality of images acquired by a plurality of image acquisition sections 1. When a plurality of image acquisition sections 1 are used the amount of information to be acquired is increased, however, there is an advantage that monitoring can be carried out reliably. FIG. 11 shows an example of the case in which three cameras, that is three image acquisition sections 1, are used. In FIG. 11, the three cameras have camera IDs of "1a", "1b", and "1c", respectively. These three cameras pick up a images concurrently.

The camera having the camera ID of "1a" detects the event 42a shown in FIG. 10 and stores an event image 36a corresponding to the event 42a in the image recording section 8. The camera having the camera ID of "1b" detects the events 42b and 42c shown in FIG. 10, and stores event images 36b and 36c corresponding to the events 42b and 42c in the image recording section 8, respectively. The camera having the camera ID of "1c" detects the event 42d shown in FIG. 10 and store an event image 36d corresponding to the event 42d in the image recording section 8.

These events 42a to 42d have only different camera IDs and are the same as the events 42a to 42d shown in FIG. 10 in other respects. Accordingly, a macro event 46 can be structurized based on the events 42a to 42d provided across the three cameras, and a macro event image corresponding to a macro event image 44 shown in FIG. 10 can be obtained. For an image interpolating the event images 36a to 36d, the next generated event is sometimes present on the images picked up by the different cameras. Therefore, the image of the camera picking up an image having the generated event is recorded as an image obtained after the generation of the event.

The event image and the macro event image corresponding to the event data 7a and the macro event data 7b which are thus created are recorded in the image recording section 8, and are managed by the event data 7a and the macro event data 7b. When the information related to an event such as an event type, an event location, an event object, an event time and the like are input from the operation section 9, the retrieval section 6 refers to the event data 7a and the macro event data 7b in the management data section 7 to cause the display section 10 to display and output an event and a macro event which are related to the input information and to give an instruction for selecting a desirable event or macro event from the displayed and output event group and macro event group. Thus, the event image or macro event image to be selected is displayed and output.

Figures 12, 13:
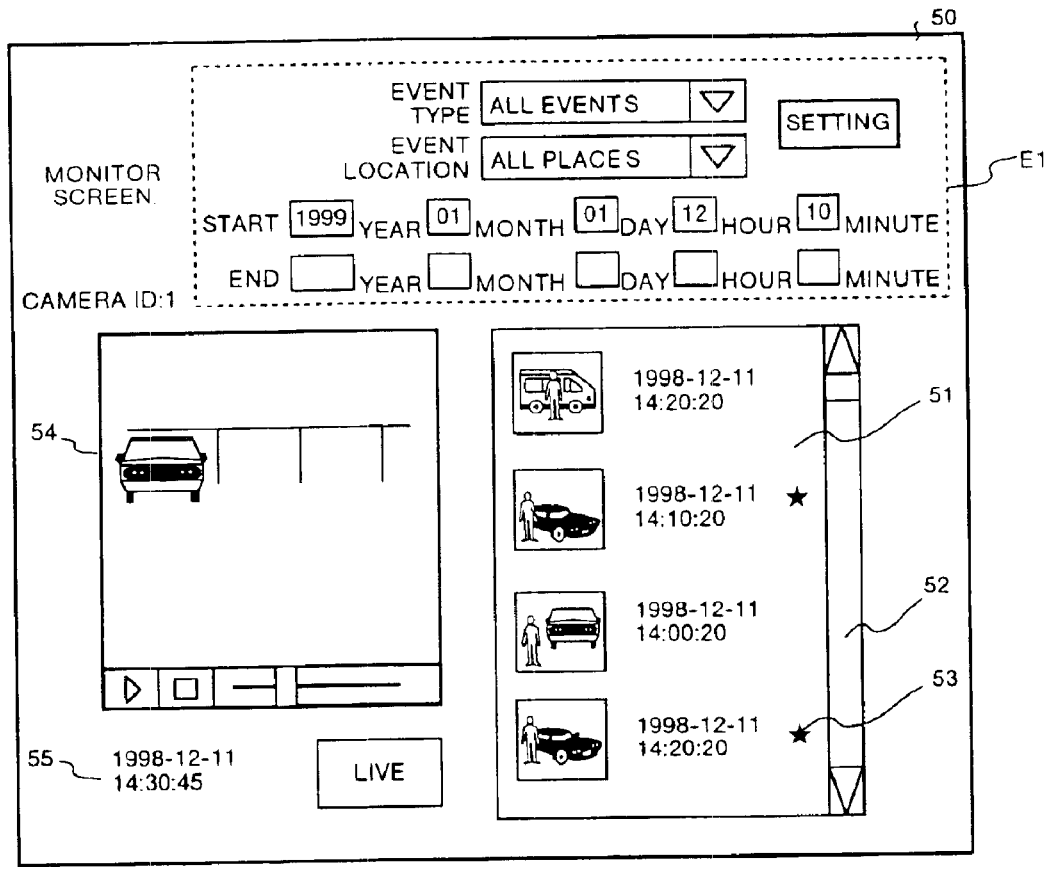
FIG. 12 is a diagram showing an example of a display screen for displaying information about the event and the macro event.
FIG. 13 is a diagram showing an example of the input of retrieval information for retrieving event data.

FIG. 12 shows an example of a graphical user interface to be displayed on the display screen of the display section 10. This graphical user interface also serves as a part of the operation section 9. In FIG. 12, an image acquired by the image acquisition section 1 in an initial state is displayed and output on a main screen 54 on a monitor screen 50 in a real time.

The time 55 indicates the time at which an image displayed and output on the main screen 54 was recorded. Every time event data or macro event data are created by the event data creation section 3, a thumb nail and an event time for the created event are added to the uppermost part in an event display column 51. By using a scroll bar 52, the event data or macro event data thus created can be displayed on the event display column 51.

By inputting desirable data to items of "event type", "event location", "start" and "end" provided in a region E1 in the monitor screen 50 and pressing down a set button, the result of retrieval is displayed in the event display column 51. FIG. 13 is a diagram showing an example of the setting of the region E1.

FIG. 13 shows that, the event type is "car parking", the event location is "parking area No. 3", the "start" is "12 o'clock, 10 minutes, Jan. 1, 1999" and the "end" is set to "12 o'clock, 10 minutes, Jan. 19, 1999". When such retrieval conditions are set, the retrieval section 6 retrieves event data and macro event data which satisfy the set retrieval conditions of the event type "2.", the event location "3" and the event time "1999/01/01 12:10:00 to 1999/01/19 12:10:00", and displays the result of the retrieval in the event display column 51. The display in the event display column 51 includes the thumbnail of the event data and the event time. More specifically, only the event data are displayed. A star mark 53 displayed on the right side of each event data indicates that there is macro event data to which the event data in this column belongs. When a star mark 53 is absent, it indicates that there is no macro event data corresponding to that particular event data.

Figure 14:
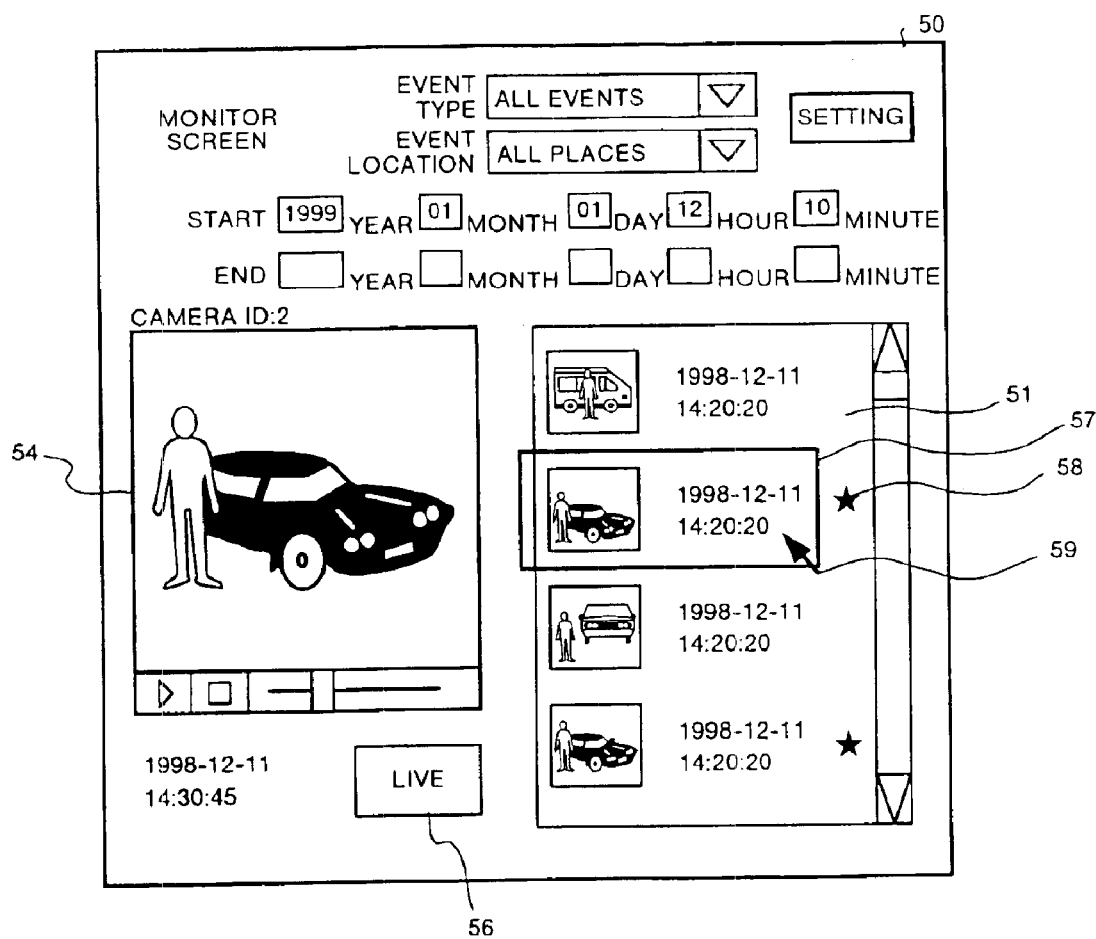
FIG. 14 is a diagram showing an example of a display screen indicative of a state in which the event data is selected and an event image is displayed.

FIG. 14 is a diagram showing the state of the monitor screen obtained when a desirable event or macro event is selected from the event display column 51. In FIG. 14, when event data 57 in the event display column 51 is selected by using a cursor 59, the retrieval section 6 fetches an event image corresponding to the event data 57 from the image recording section 8 and displays and outputs the event image on the main screen 54 in the monitor screen 50 of the display section 10. To the lower column of the main screen 54 is connected a GUI capable of reproducing, temporarily stopping, rewinding and feeding the image displayed on the main screen.

When a the star mark 58 displayed on the right end of the event data 57 is selected by using the cursor 59, macro event data including the event data 57 are retrieved and are displayed and output on the main screen 54. The display on the main screen 54 can switch a real-time image, a selected event image or a macro event image by the selection of a switch button 56. Although the maim screen 54 is displayed in a fixed region in the monitor screen 50, another main screen corresponding to the main screen 54 may be displayed in a separate frame. Furthermore, a plurality of monitor screens may be displayed as a multi-window method.

As explained above, according to the first embodiment, macro event data including a related event and having a time width are generated in accordance with the macro event definition contents, and a macro event image is recorded in accordance with the generated macro event data. Therefore, it is possible to rapidly and easily acquire significant image information which cannot be grasped by only the event image obtained before and after the generation of an event.

A second embodiment of the present invention will be explained. While a macro event definition in which a constant number of events according to a predetermined order constitute a macro event has been carried out in the first embodiment, it is possible to carry out a macro event definition in which the number of events constituting a macro event is not always constant. That is, if certain conditions are satisfied variable number of events which number can exceed the constant number are permitted. This case is explained below as the second embodiment.

Figure 15:
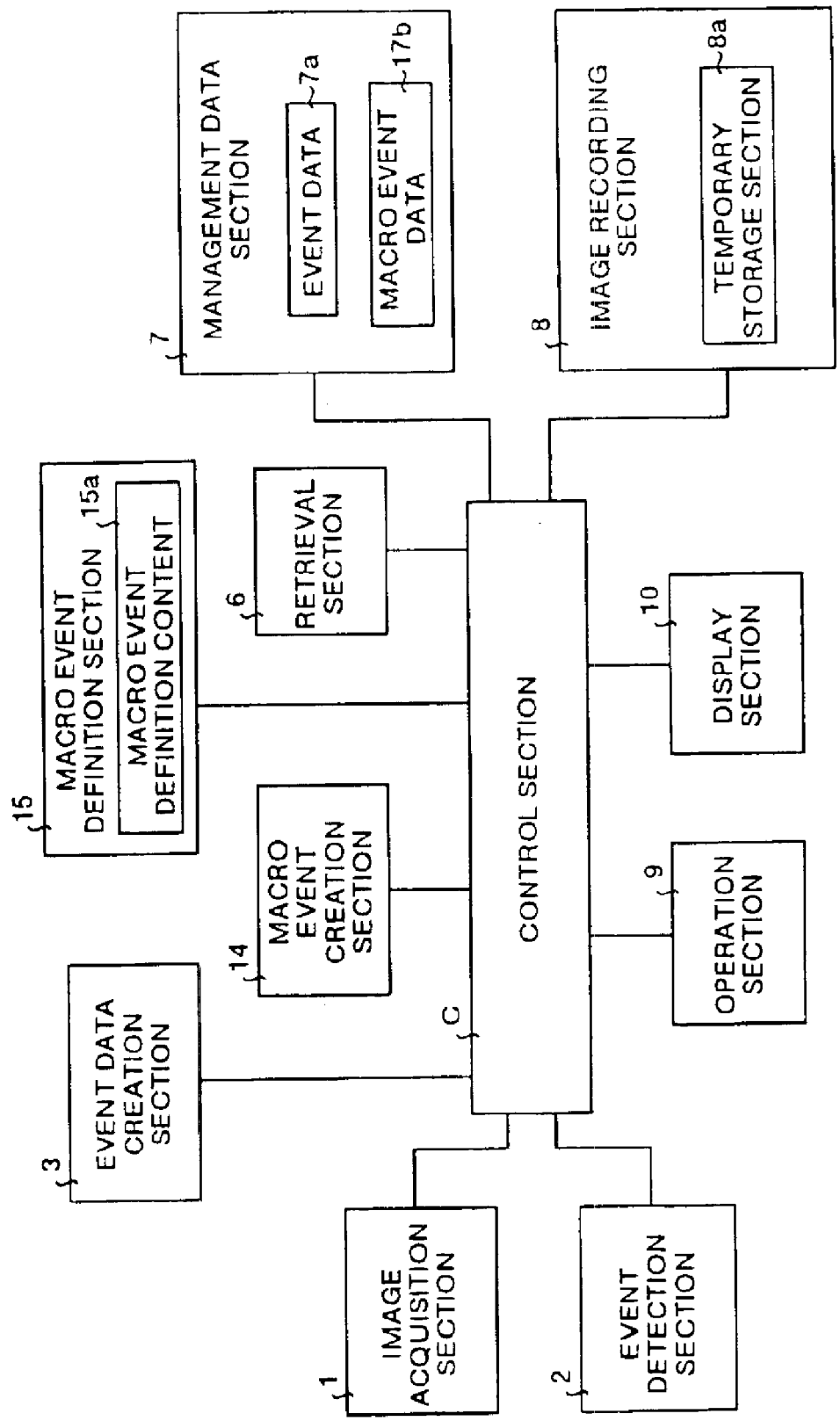
FIG. 15 is a block diagram showing a complete structure of an image collection apparatus according to a second embodiment.

FIG. 15 is a block diagram showing a complete structure of an information collection apparatus according to the second embodiment. In FIG. 15, a macro event definition section 15 has macro event definition contents 15a which permit a variable number of events to define a macro event. The management data section 7 has macro event data 17b created according to the macro event definition contents 15a. Other elements are the same as those in the first embodiment and they have been provided with the same reference numerals.

A macro event including an unspecified event defined by the macro event definition section 15 will be described below. In the first embodiment, the macro event has been defined in such a manner that an event type is always constituted by four events having an order of "car entry"-"car parking"-"car departure"-"car leaving". However, in the case in which an event for the entry of unspecified number of people is generated between the "car parking" and the "car departure", for example, it is supposed that the event of "person entry" is related to the parking situation of a series of cars, and it is desirable that the event of "person entry" should be added as a macro event. When the event of the unspecified number of "person entry" is added to the macro event, the event type is constituted in the order of "car entry"-"car parking"-"people entry"-"person entry"- . . . -"person entry"-"car departure"→"car leaving", and the unspecified number of events constitute the macro event.

FIG. 16 is a diagram showing an example of the macro event definition contents including such unspecified number of events. In FIG. 16, the macro event definition contents 15a correspond to the macro event definition contents 5a. The value of the event type in an order value 61e is not set to "3" but "3:5". The value of "3" indicates the event type of "car departure" and the value of "5" indicates the event type of "people entry". In the case in which the event type does not have the value of "3" in the order of the order value 61e, and furthermore, the value of the event type is "5", the event having the event type of "5" is registered as an event constituting the macro event.

In the case in which the event type has the value of "3" in the order of the order value 61e, an event having the event type of "3" is registered as an event constituting the macro event and a processing proceeds in the order of a next order value 61f. Accordingly, as long as the event type has the value of "5" in the order of the order value 61e, the processing does not proceed to the next order but the value of "3" is repetitively checked. In other words, it is apparent that the value of "5" in the order value 61e is a condition value for registering the event for the event type having the value of "5" as the macro event and for checking the value of "3" of the order value 61e again without proceeding to the next order.

Figure 17:
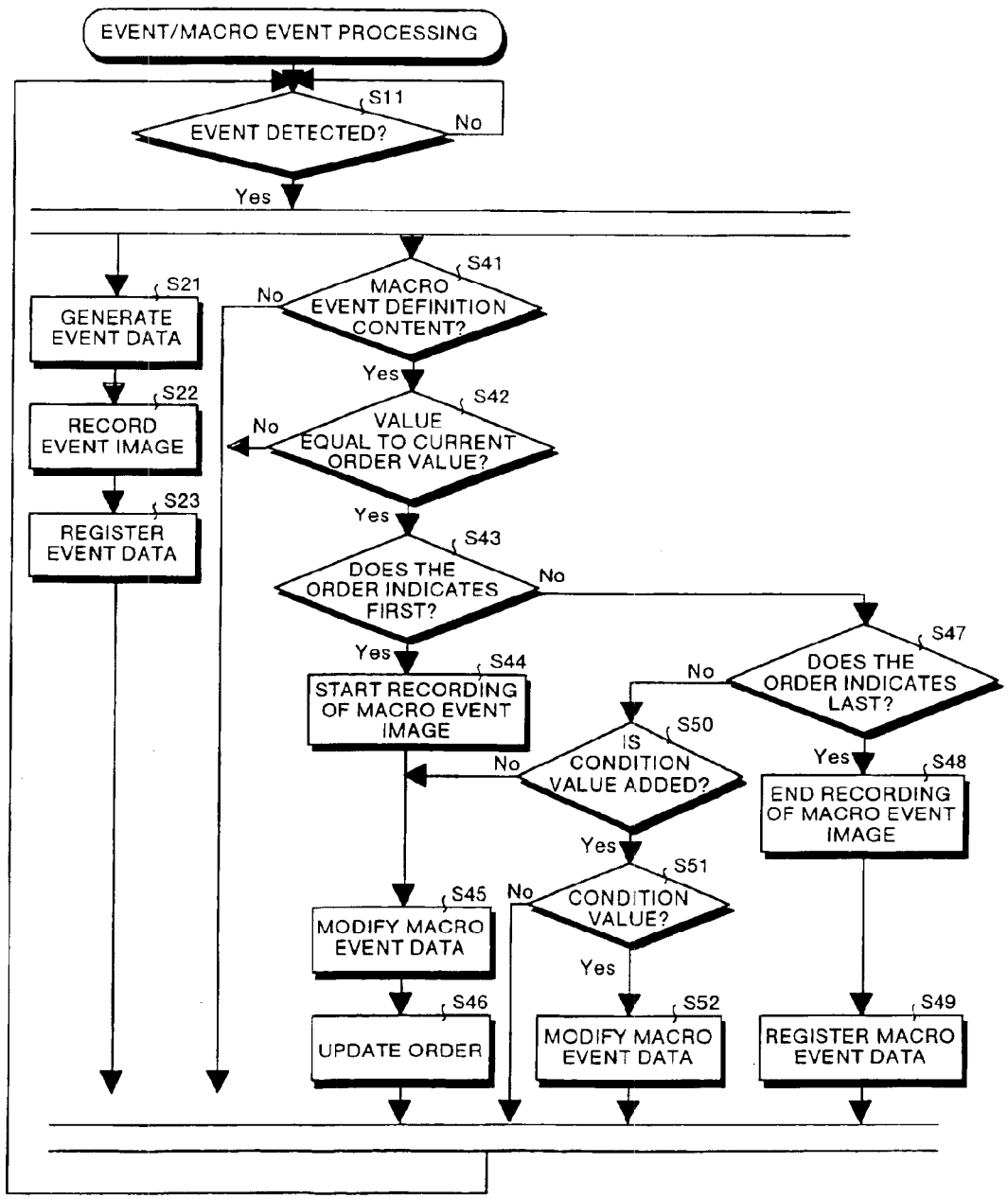
FIG. 17 is a flowchart showing the control procedure for an event processing and a macro event processing which are carried out by a control section of the image collection apparatus according to the second embodiment.

An event processing and a macro event processing (event/macro event processing) which are to be carried out by the control section C will be described here with reference to the flowchart shown in FIG. 17. As shown in FIG. 17, when an event is detected by the event detection section 2 (Step S11), the control section C carries out the event processing of Steps S21 to S23 and the macro event processing of Steps S41 to S52 in parallel and repeats this processing each time the event is detected.

In the event processing, the event data creation section 3 generates event data based on information about the event detected by the event detection section 2 (Step S21). Further, the event data creation section 3 records an event image corresponding to the event data in the image recording section 8 (Step S22) in the same manner as in the first embodiment. Thereafter, the event data generated at the Step S21 is registered as event data 7a in the management data section 7 (Step S23). The process then returns to the Step S11.

In the macro event processing, it is decided whether or not the detected event has the contents defined as the macro event definition contents 15a (Step S41). More specifically, the decision whether or not the detected event has the macro event definition contents 15a implies the decision whether or not the event object is identical. If the detected event does not have the macro event definition contents 15a (Step S41, NO), the process returns to the step S11 where the detection of a next event is waited. If the detected event has the macro event definition contents 15a (Step S41, YES), it is decided whether or not the detected event type has the same value as the current order value (Step S42). If the event type does not have a value same as the current order value (Step S42, NO), the event is not related to the macro event at all. Therefore, the process returns to the Step S11 where the detection of a next event is waited. If the event type has a value same as the current order value (Step S42, YES), it is decided whether or not the current order value indicates first in the order (Step S43).

If the current order value indicates first order (Step S43, YES), the recording of a macro event image is started at 10 seconds before the event time of the detected event (Step S44) and a continuous macro event image is recorded in the image recording section 8. Then, the macro event data at the current point is modified (Step S45) and the current order is further updated (Step S46). Then, the process returns to the Step S11 where the detection of a next event is waited.

On the other hand, if the current order value does not indicate the first order (Step S43, NO), it is further decided whether or not the current order value indicates the last order (Step S47). If current order value indicates the last order (Step S47, YES), the recording of the macro event image which is being recorded is terminated after 30 seconds since the detected event time (Step S48) and the modified macro event data are registered as the macro event data 17b of the management data section 7 (Step S49). Then, the process returns to the Step S11 where the detection of a next event is waited.

If the current order value does not indicate the last order (Step S47, NO), it is decided whether or not a condition value is added to the order value in the current order (Step S50). If the condition value is not added (Step S50, NO), the process proceeds to Step S45 where the macro event data at the current point is modified (Step S45). Furthermore, the order is updated (Step S46). Then, process returns to the Step S11 where the detection of a next event is waited.

On the other hand, if the condition value is added (Step S50, YES), it is decided whether or not the value of the event type of the detected event is equal to the condition value (Step S51). If the value of the event type is not equal to the condition value (Step S51, NO), the process returns to the Step S11 where the detection of a next event is waited. If the value of the event type is equal to the condition value (Step S51, YES), the macro event data are modified in order to add the detected event as an event constituting a macro event (Step S52) and the order is not updated. Then, the process returns to the Step S11 where the detection of a next event is waited.

FIG. 18 is a diagram showing an example of the created macro event data 17a. The macro event data 17a shown in FIG. 18 is created based on the event data 7a shown in FIG. 8. Events 11 having an event type of "5" and event IDs of "12" and "18" are added as the macro event.

According to the second embodiment, an unspecified number of events such as "person entry" are added as the events constituting the macro event. Therefore, it is possible to create flexible macro event data and to record a macro event image corresponding to the macro event data.

A third embodiment of the present invention will be described below. While an image between the first event and the last event which constitute a macro event has been continuously recorded as a macro event image in the first and second embodiments, a macro event image is summarized and recorded and an image recording capacity is reduced if a macro event continues for a longer time in this third embodiment.

Figure 19:
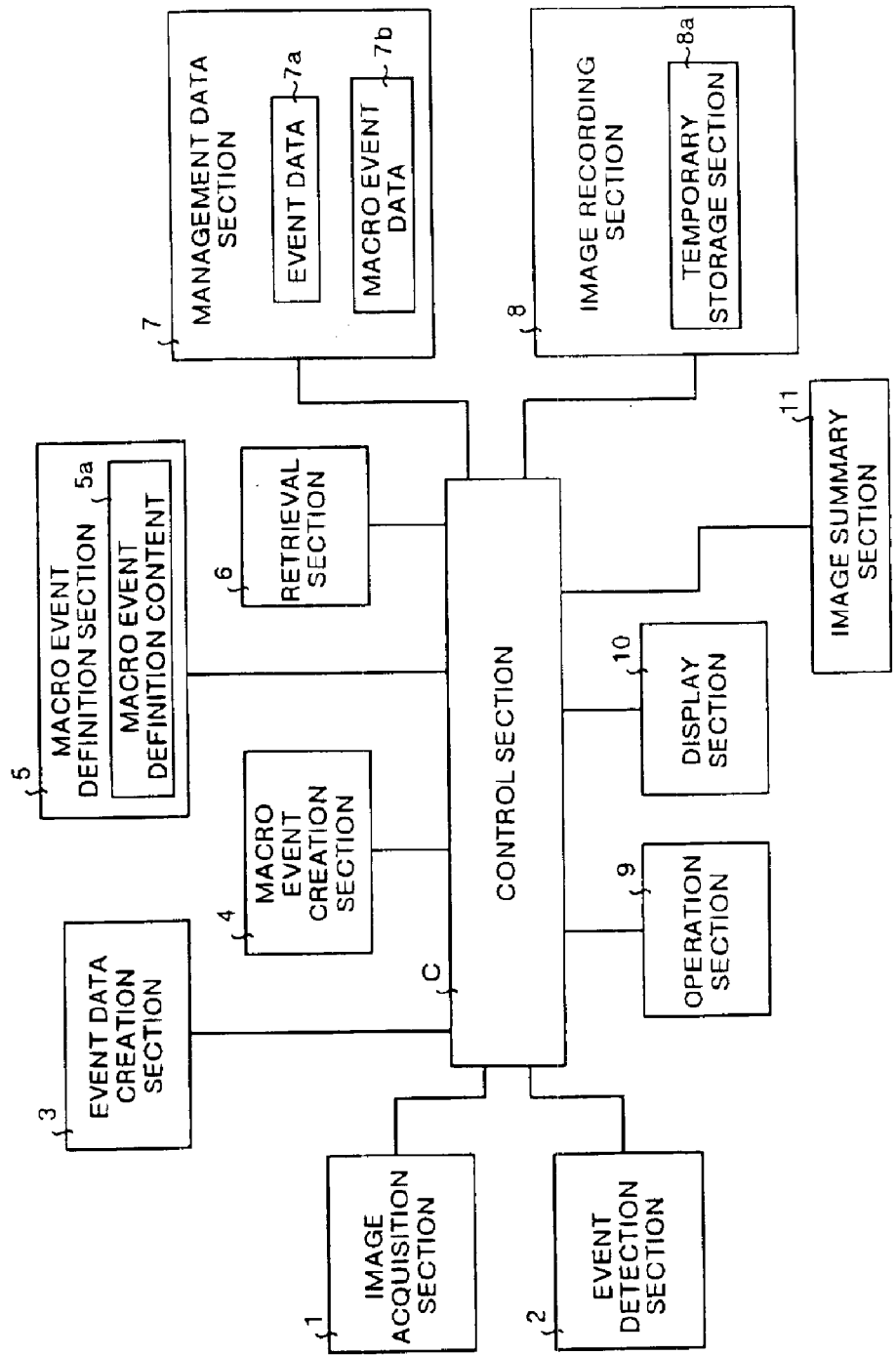
FIG. 19 is a block diagram showing a complete structure of an image collection apparatus according to a third embodiment.

FIG. 19 is a block diagram showing a complete structure of an image collection apparatus according to the third embodiment of the present invention. An image summary section 11 serves to summarize and record a macro event image corresponding to macro event data when recording the same macro event image in the image recording section 8. Other elements are the same as those in the first embodiment and they have been provided with the same reference numerals.

Figure 20:
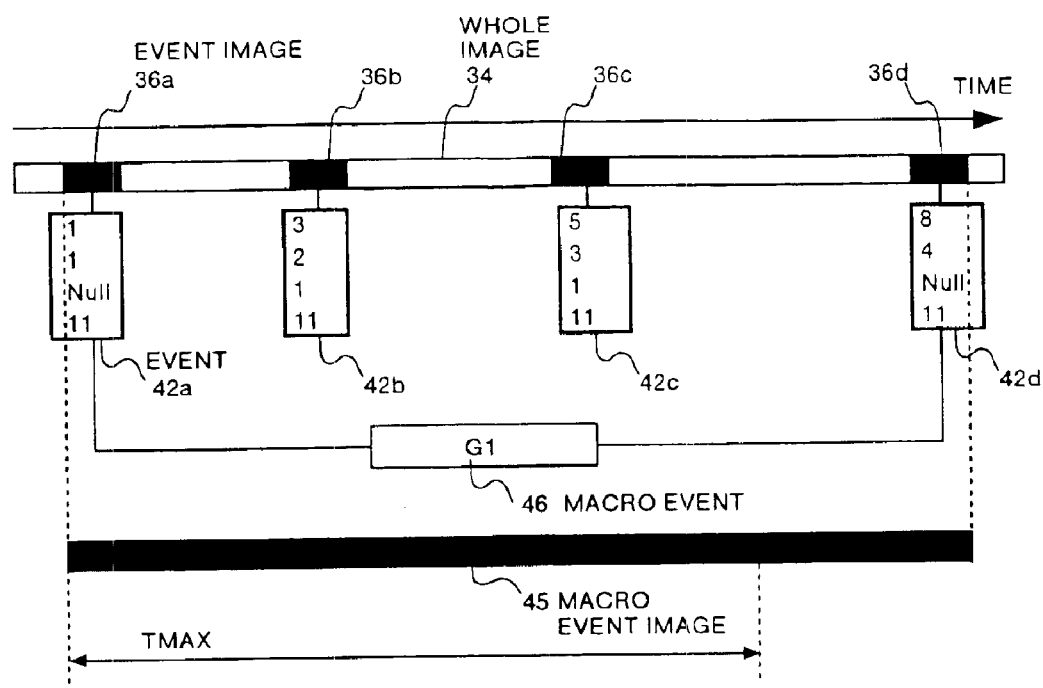
FIG. 20 is a diagram showing a predetermined time at which recording is permitted in the case in which a macro event image is to be recorded for a long period of time.
Figure 21:
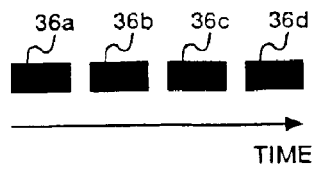
FIG. 21 is a diagram showing an example of the summary of a macro event image according to the third embodiment.

FIG. 20 is a diagram showing a summary processing carried out by the image summary section 11, indicating the relationship between an event corresponding to the generation of the macro event image 45 shown in FIG. 10 and a macro event. In FIG. 20, a macro event 46 is obtained by structurizing four events 42a to 42d. The macro event image 45 is recorded in the image recording section 8 corresponding to the macro event 46. If an imaging time for the macro event image 45 exceeds a predetermined time TMAX, the image summary section 11 selects, as macro event images, event images 36a to 36d corresponding to the events 42a to 42d as shown in FIG. 21, and connects the event images 36a to 36d and records them in the image recording section 8. Consequently, the macro event image 45 for a longer time can be summarized.

The event images 36a to 36d are recorded corresponding to the events 42a to 42d, respectively. Therefore, the event images 36a to 36d are not newly recorded but they may be connected during reproduction by using the macro event data 7a. In this case, the event/macro event processing can be implemented by means of the control section C by deleting the start of the record of a macro event image (Step S34) and the end of the record of the macro event image (Step S38) from the Steps S31 to S39 shown in FIG. 7, for example. By summarizing the macro event image using the event images 36a to 36d, the recording capacity of the image recording section 8 can further be reduced.

Figure 22:
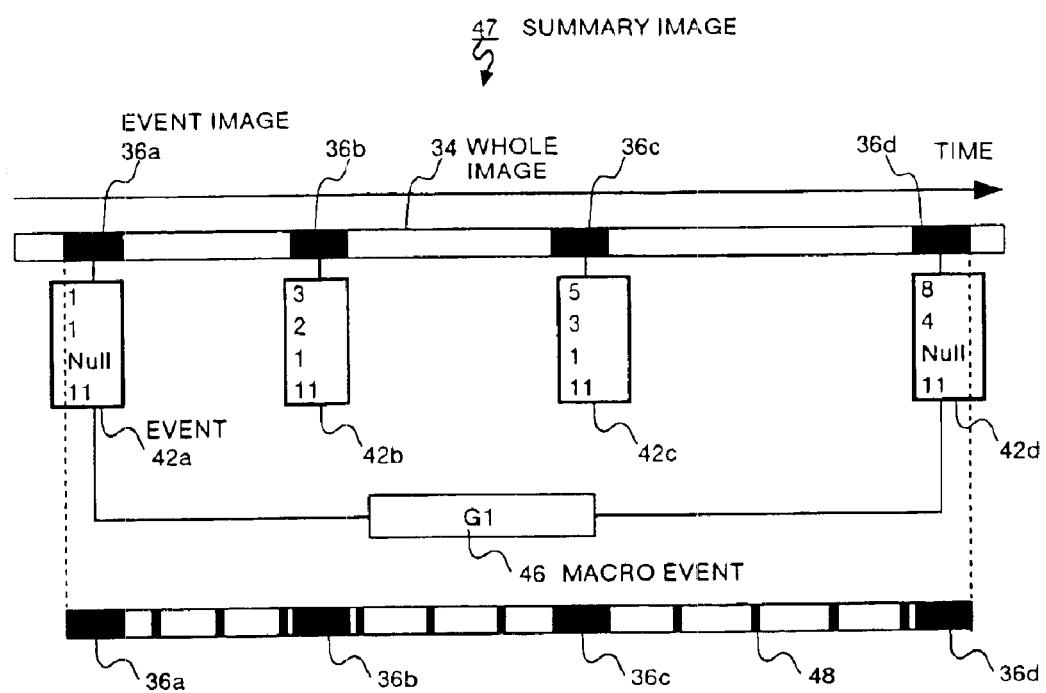
FIG. 22 is a diagram showing an example of the summary of the macro event image according to the third embodiment.

FIG. 22 is a diagram showing an example of a macro event image interpolated by a static image periodically acquired between the event images 36a to 36d. FIG. 22 corresponds to FIG. 20 and shows the relationship among an event, an event image and macro event, and a macro event image. As shown in FIG. 22, the image summary section 11 does not simply connect the event images 36a to 36d but interpolates the event images 36a to 36d by a static image 48 periodically acquired between the events, and records a summary image 47 to be a macro event image which is connected including the interpolated static image 48. According to the summary image 47, the static image 48 is interpolated between the event images 36a to 36d. Therefore, a change in the situation between the events 42a to 42d can be known with a minimum storage capacity and the whole macro event can also be grasped easily.

While the macro event image has been summarized by using the event image in the third embodiment, an event image of an event other than the event constituting a macro event may be recorded as a macro event image.

When a plurality of image acquisition sections 1 are provided and the event is provided across the image acquisition sections 1, it is not easy to select a continuous image between the images in the first and second embodiments. In the case in which the macro event image is summarized by using the image summary section 11, it is sufficient that only the event image provided across the image acquisition sections 1 is connected. Therefore, the summary is particularly effective in the case in which a macro event image is to be recorded by using the image acquisition sections 1.

According to the third embodiment, the macro event image for a long time is summarized by the image summary section 11 and the summarized macro event image is recorded. Therefore, the recording capacity of the image recording section 8 can be reduced.

A fourth embodiment of the present invention will be described below. In the fourth embodiment, data supporting the monitor and analysis of an event or a macro event which is acquired in the first to third embodiments are measured and the measured data are displayed during the display of the event or the macro event.

Figure 23:
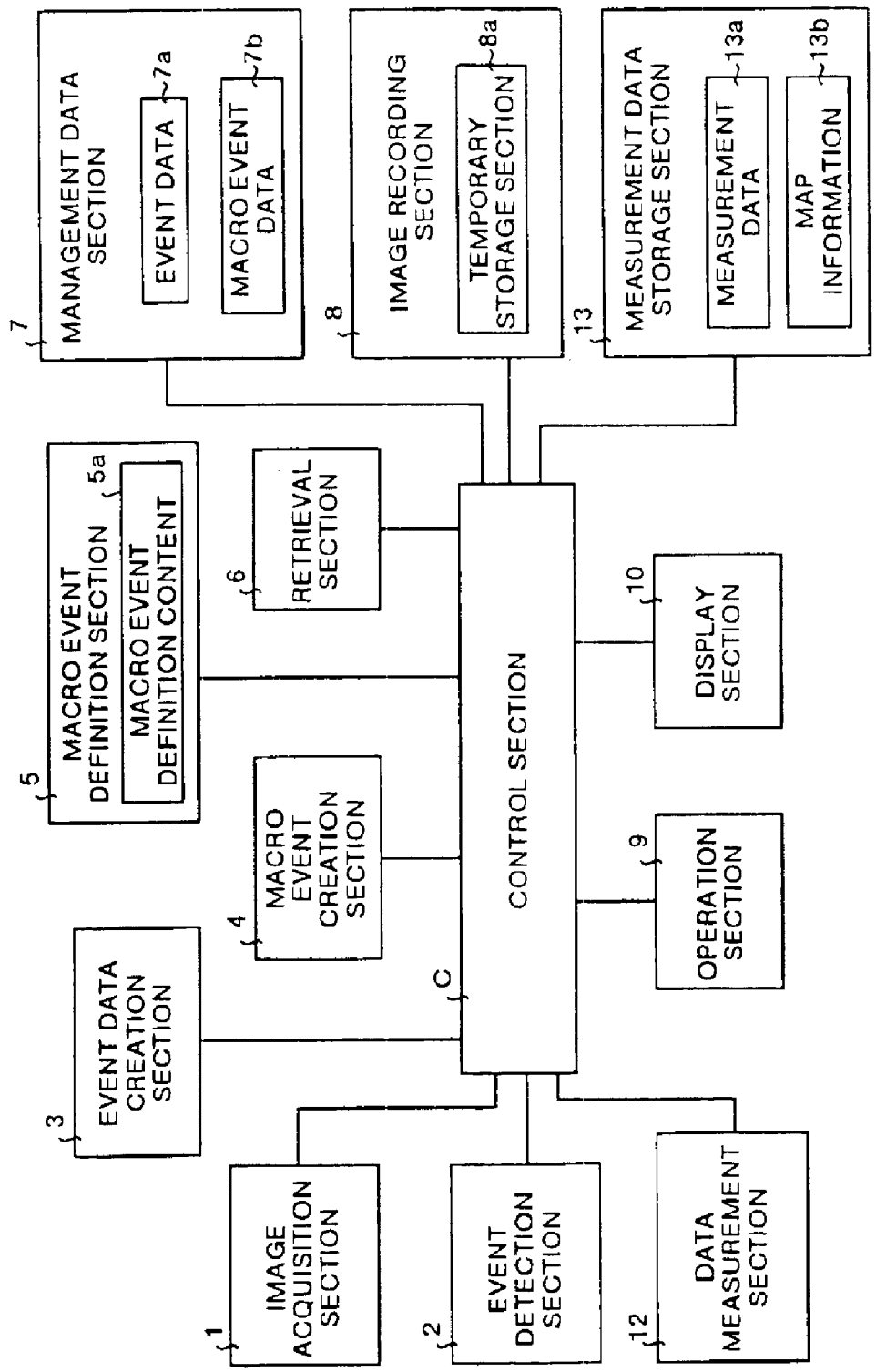
FIG. 23 is a block diagram showing a complete structure of an image collection apparatus according to a fourth embodiment.

FIG. 23 is a block diagram showing a complete structure of an image collection apparatus according to the fourth embodiment. A data measurement section 2 is specifically implemented by a GPS receiver. By the GPS receiver, position information such as latitude, longitude, direction and time is measured and output to the control section C. A measurement data storage section 13 receives the data measured by the data measurement section 12 through the control section C and stores the measured data as measurement data 13a and holds map information 13b. Other elements are the same as those in the first embodiment and they have been provided with the same reference numerals.

When an instruction for the display of an event or a macro event is given from the operation section 9, the retrieval section 6 acquires the measurement data corresponding to the event or the macro event to which the instruction for the display is given and the control section C causes the display section 10 to display the event or the macro event and to display the measurement data.

Figures 24, 25:
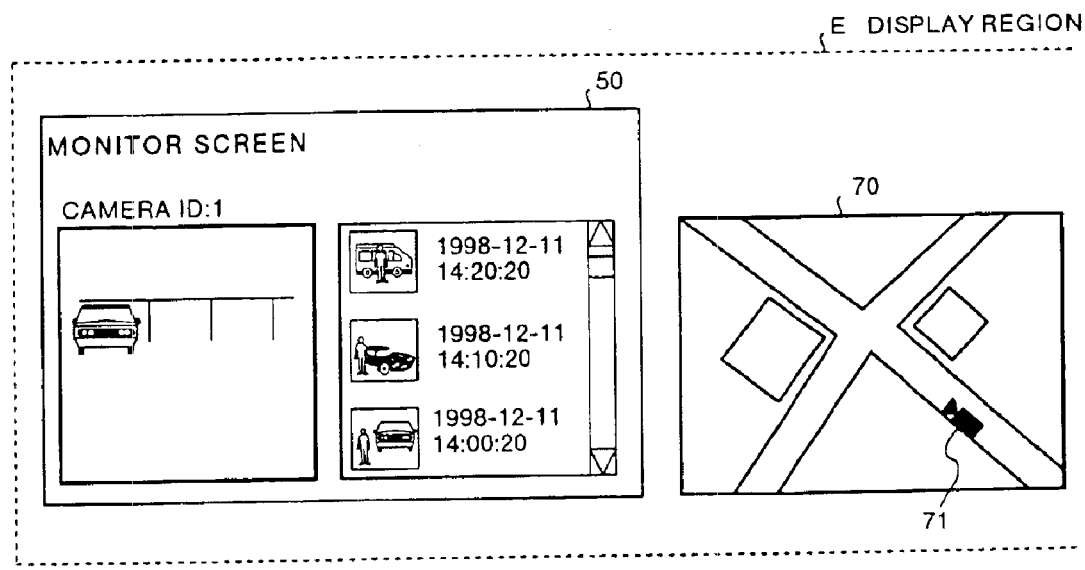
FIG. 24 is a diagram showing an example of measurement data according to the fourth embodiment.
FIG. 25 is a diagram showing an example of the display of the measurement data to be displayed according to the fourth embodiment.

FIG. 24 is a diagram showing an example of the measured data stored in the measurement data storage section 13. In FIG. 24, the measured data are recorded as a table for position information corresponding to two cameras (image acquisition sections 1) having camera IDs of "1" and "2". Measured data on a latitude, a longitude and a direction are recorded in each table for each time. The "direction" indicates a clockwise angle by setting the north to 0 degree. The event or the measured data referred at the time of the display of the event are obtained by retrieving the camera ID. The time is collated with the time of the event to display the position information about each camera.

FIG. 25 is a diagram showing an example of the display of the measured data which are displayed together with an event image or a macro event image. In FIG. 25, a monitor screen 50 and a measured data display screen 70 are provided in one display region E. The information about the event or the macro event, particularly, the event image or the macro event image is displayed and output onto the monitor screen 50. The measured data on the event information or the macro event image, that is, the position information of the camera are displayed onto the measured data display screen 70 synchronously with time information about the event image or the macro event image which is displayed on the monitor screen.

Map information 13b collated with the position of the camera is fetched and an icon 71 of the camera is superposed on the map information 13b for the display. Consequently, the measured data are specifically displayed and output. The icon 71 has the shape of a camera for easy recognition, and the direction thereof is displayed corresponding to that of the measured data 13a. While the monitor screen 50 and the measured data display screen 70 are displayed in one display region E, a plurality of display sections 10 may be provided and the monitor screen 50 and the measured data display screen may be provided individually.

According to the fourth embodiment, the data related to the event or the macro event are measured and the measured data are displayed or graphically displayed synchronously with the display of the event or the macro event. Therefore, the contents of the event or the macro event can easily be understood. In particular, in the case in which the image acquisition section 1 such as a camera is moved, it is hard to grasp the image to be acquired. Therefore, the present embodiment is particularly effective.

A fifth embodiment of the present invention will be described below. While the image collection apparatus has monitored a parking lot and the like by using an event image or a macro event image in all the first to fourth embodiments, an event image or a macro event image is analyzed by using an event image in the fifth embodiment.

Figure 26:
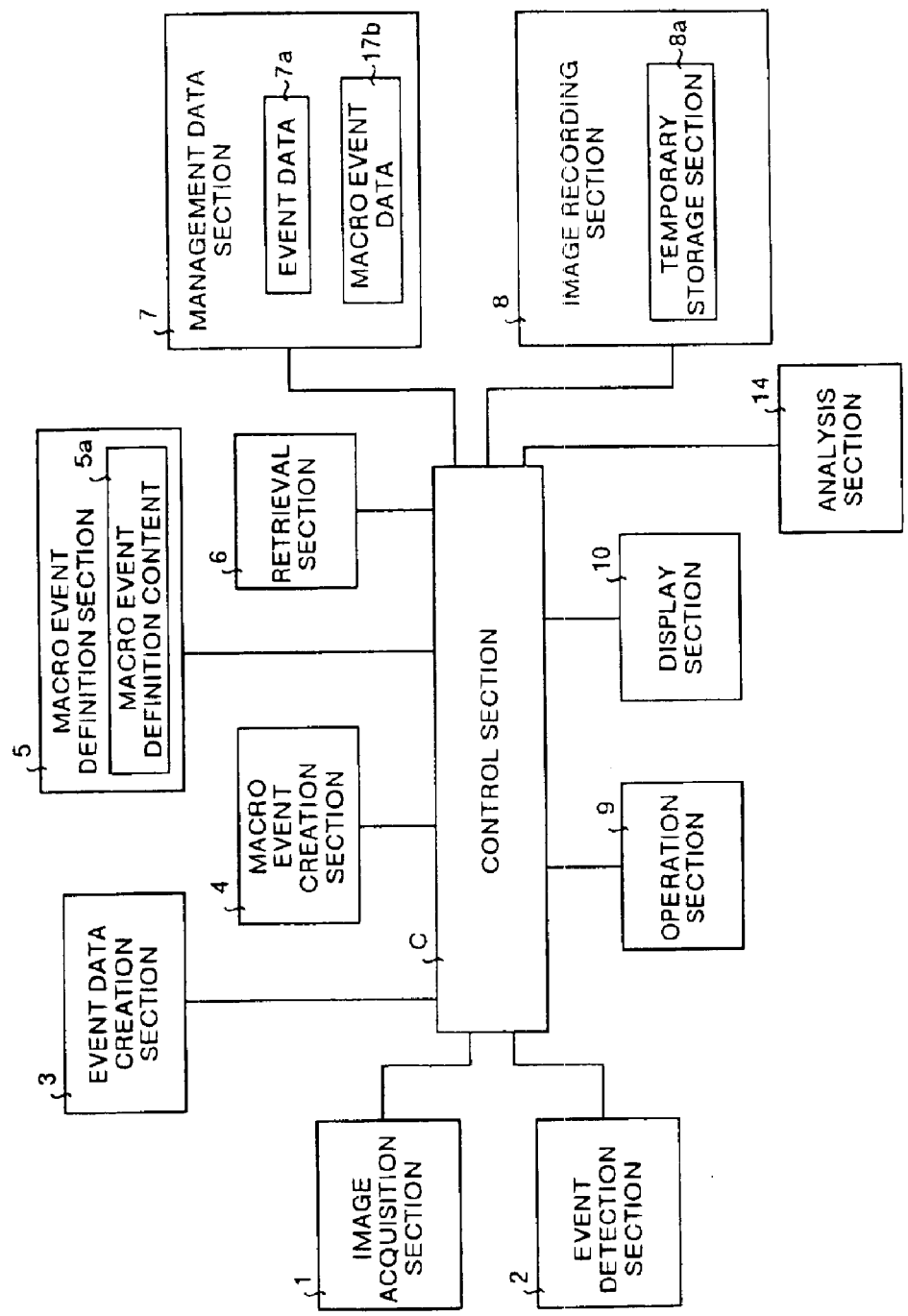
FIG. 26 is a block diagram showing a complete structure of an image collection apparatus according to a fifth embodiment.

FIG. 26 is a block diagram showing a complete structure of the image collection apparatus according to the fifth embodiment of the present invention. An analysis section 14 carries out a predetermined analysis processing based on an event image and a macro event image which are recorded in an image recording section 8. Other elements are the same as those in the first embodiment and they have been provided with the same reference numerals.

Figure 27:
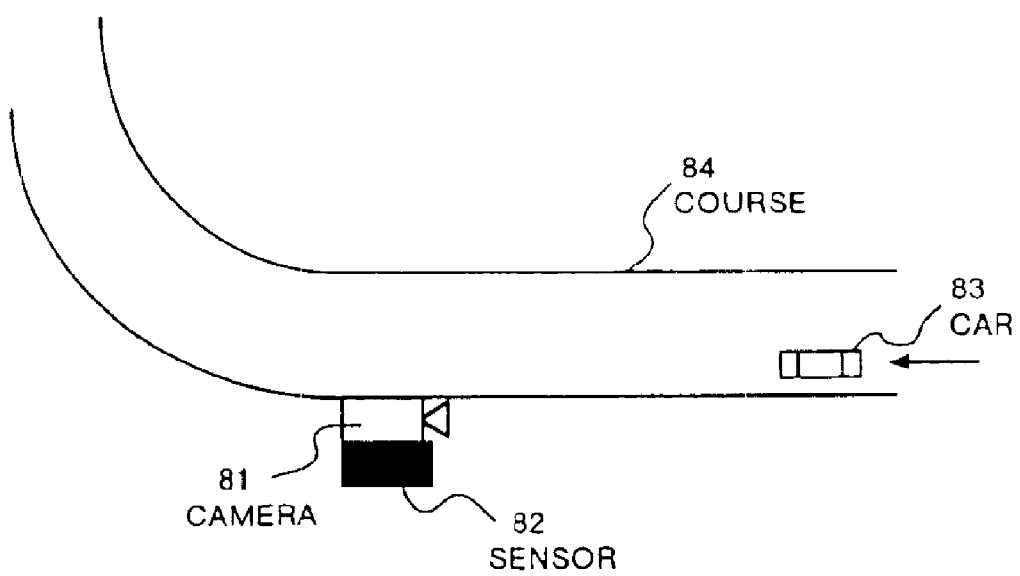
FIG. 27 concretely shows the arrangement of the image collection apparatus according to the fifth embodiment.
Figure 28:
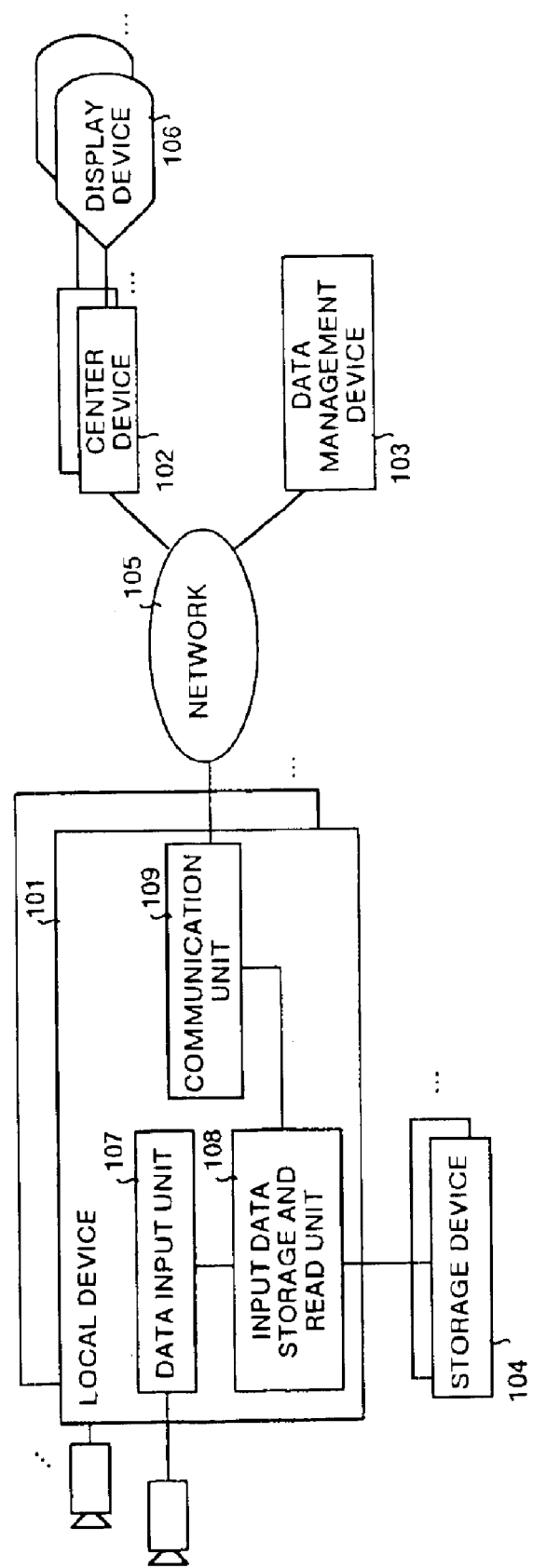
FIG. 28 is a block diagram showing a complete structure of a conventional image collection apparatus.
Figure 30:
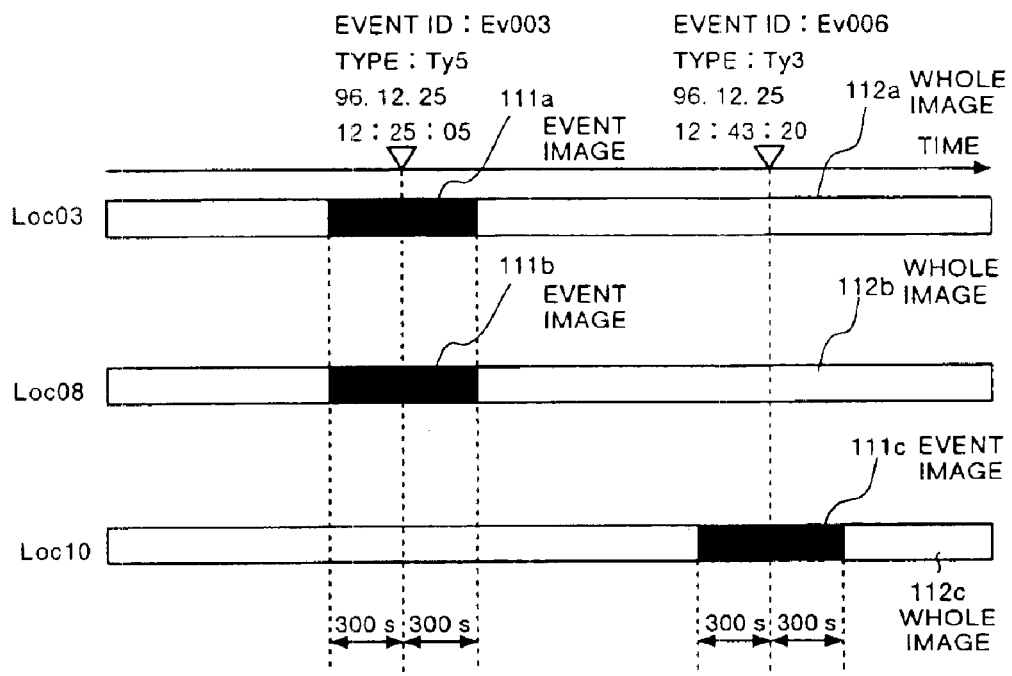
FIG. 30 is a diagram showing the relationship between a whole image picked up by a plurality of local devices in the conventional image collection apparatus and an event image.
Figure 31:
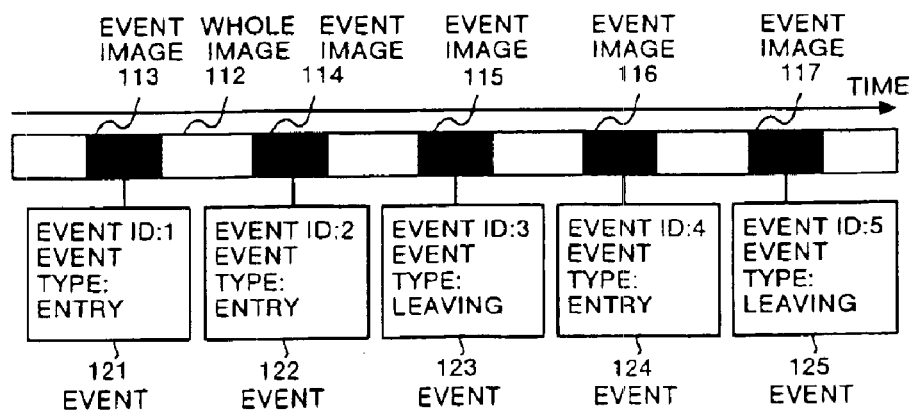
FIG. 31 is a diagram showing the relationship between related events and the event image.
Figure 32:
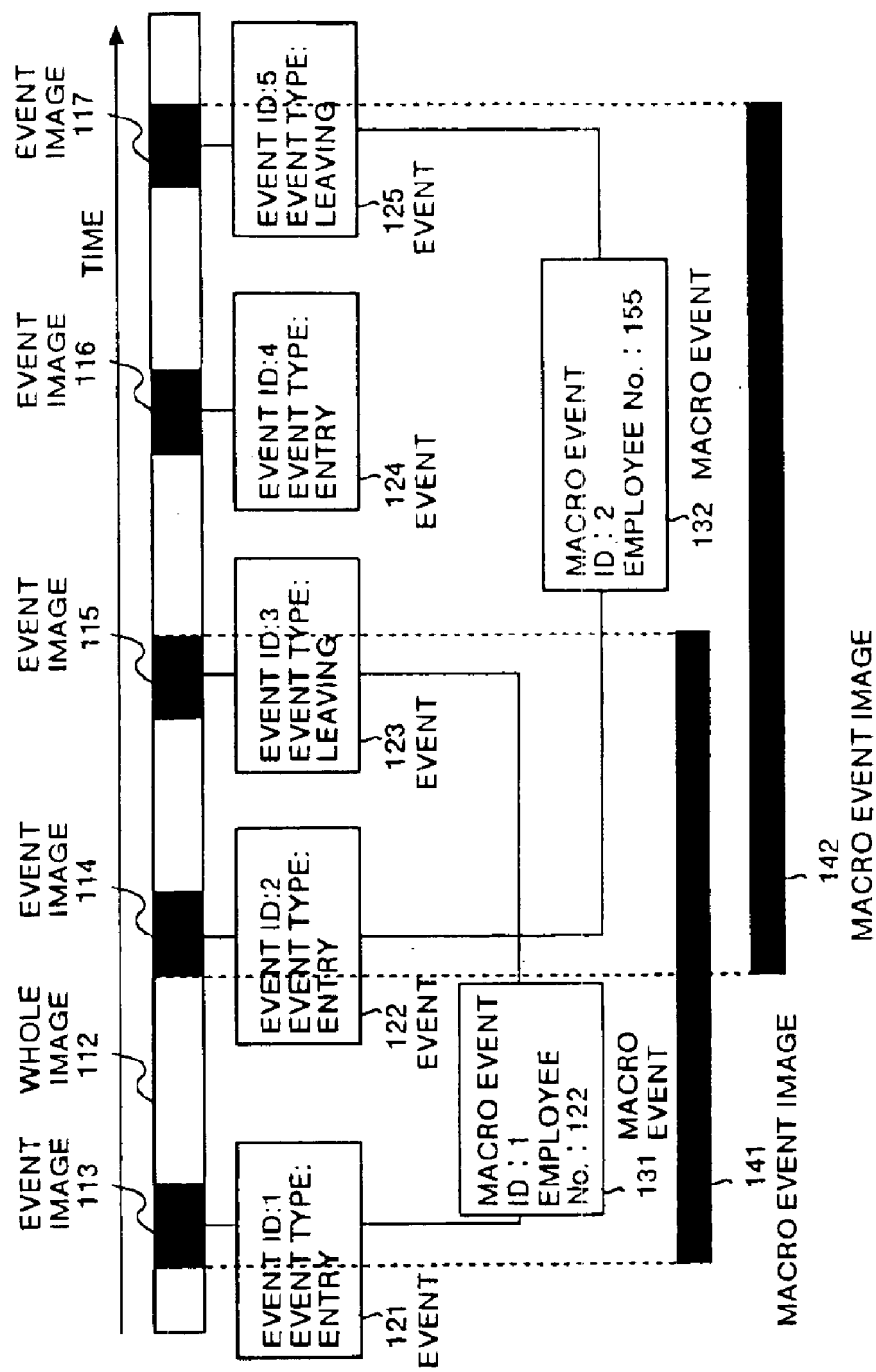
FIG. 32 is a diagram showing a relationship between related events, event image and a macro event image.

The analysis section 14 analyzes the behavior of a car. As shown in FIG. 27, therefore, a camera 81 acting as an image acquisition section 1 is provided on the road side of a circuit course 84, and a sensor 82 acting as an event detection section 2 is similarly installed in the vicinity of the camera 81. The sensor 82 reads the speed and acceleration speed (deceleration speed) of a car 83 running on the circuit course 84 and a number drawn on the body of the running car 83.

An event type constituting event data includes four, that is, "car entry", "deceleration start", "deceleration end" and "car leaving". Accordingly, it is possible to create a macro event by structurizing a plurality of events having the same number and corresponding to the event type.

In the circuit, a large number of cars run around the same course many times. Also in the corner in which the camera 81 is installed, therefore, a large number of cars pass many times while decelerating. Thus, a macro event image related to a series of movements is recorded. Accordingly, a macro event image related to a series of events including "car entry"-"deceleration start"-"deceleration end"-"car leaving"

on this side of the corner of a specific car can easily be retrieved from the image picked up by the camera 81 where a plurality of cars are viewed, and can be displayed and output.

The analysis section 14 analyzes the behavior of the car based on the information about the macro event thus obtained. In that case, since the information is recorded as the macro event, the analysis processing can be carried out rapidly.

According to the fifth embodiment, the analysis section 14 can carry out an analysis processing by using the information about the macro event. Therefore, the analysis processing can easily be carried out. The first to fifth embodiments can be combined properly.

According to one aspect of the present invention, as described above, the image acquisition unit acquires an image, the event detection unit detects an event, and the event data creation unit creates event data indicative of at least a generation time and contents of the event detected by the event detection unit. The macro event definition unit which defines a macro event including a related event group and having a time width by using the generation time and contents of the event, the macro event data creation unit creates macro event data by structurizing a plurality of event data based on definition contents of the macro event, and the image recording unit records an image of a macro event corresponding to the macro event data. The retrieval unit retrieves a desirable macro event based on the macro event data, and the display unit acquires at least an image of the macro event retrieved by the retrieval unit from the image recording unit and displays the image. Consequently, it is possible to rapidly and easily obtain image information which cannot be grasped by only the event image before and after the event generation and is significant and inclusive.

Further, the temporary storage unit temporarily stores the image acquired by the image acquisition unit, the image recording unit extracting and recording an image related to an event detected by the event detection unit from the image temporarily stored by the temporary storage unit. Consequently, the recording capacity of the image recording unit can be reduced so that monitoring for a longer time can be carried out. In addition, it is possible to implement an image collection apparatus which is light and small-sized.

Further, the macro event definition unit carries out definition including repetition of a predetermined event in a series of events constituting the macro event and the macro event data creation unit creates macro event data in accordance with the definition contents. Consequently, it is possible to easily obtain a flexible image of the macro event.

Further, the image summary unit selects an image in a predetermined portion of the image of the macro event and summarizes the image of the macro event, the image recording unit recording the image of the macro event summarized by the image summary unit. Consequently, the recording capacity of the image recording unit can be reduced so that monitoring for a longer time can be carried out. In addition, it is possible to implement an image collection apparatus which is light and small-sized.

Further, the image summary unit selects an image in a predetermined portion of the image of the macro event, periodically acquires a static image from a non-selected image of the macro event and connects the selected image with the static image on a time basis, thereby summarizing the image of the macro event, the image recording unit recording the image of the macro event summarized by the image summary unit, and particularly, intermittently interpolating the images selected by the static image. Consequently, the non-selected image portion with the summary can be complemented efficiently. Furthermore, the recording capacity of the image recording unit can be reduced so that monitoring for a longer time can be carried out. In addition, it is possible to implement an image collection apparatus which is light and small-sized.

Further, the measurement unit measures data related to the image, and the measured data storage unit stores the measured data acquired by the measurement unit in relation to the macro event, the display unit displaying the image of the macro event and displaying the measured data related to the macro event, thereby supporting to understand the contents of the image of the macro event. Consequently, it is easy to understand the contents of the event image or the macro event image. In particular, in the case in which the image acquisition unit is moved, the position information is set to the measurement data so that it is possible to easily understand the contents of the event image or the macro event image.

Further, the image recording unit selects one of the image acquisition units corresponding to the image of the macro event from a plurality of images input from a plurality of image acquisition units and records, as the image of the macro event, the image input from the selected image acquisition unit. Consequently, also in the case in which the image is to be acquired by a plurality of image acquisition units, it is easy to obtain the macro event image.

Further, the analysis unit carries out an analysis processing such as the analysis of the behavior of a car based on at least the image of the macro event. Therefore, in the case in which the predetermined analysis processing is to be carried out based on the collected image, it is possible to carry out the analysis processing which is more inclusive and efficient.

According to another aspect of the present invention, an image is acquired and an event is detected at the acquiring step, event data indicative of at least a generation time and contents of the event detected at the acquiring step are created at the event data creating step, macro event data are created by structurizing a plurality of event data generated by the event data generation unit based on macro event definition contents defining a macro event including a related event group and having a time width at the macro event data creating step, an image of a macro event corresponding to the macro event data is recorded at the image recording step, a desirable macro event is retrieved based on the macro event data at the retrieving step, and at least the image of the macro event retrieved at the retrieving step is acquired and displayed at the displaying step. Consequently, it is possible to rapidly and easily obtain image information which cannot be grasped by only the event image before and after the event generation and is significant and inclusive.

Further, the image acquired at the acquiring step is temporarily stored at the temporary storing step, the image recording step extracting and recording an image related to an event detected at the acquiring step from the image temporarily stored at the temporary storing step. Consequently, the recording capacity of the image recording unit can be reduced so that monitoring for a longer time can be carried out. In addition, it is possible to implement an image collection apparatus which is light and small-sized.

Further, the macro event creating step creates macro event data based on the macro event definition contents defined including repetition of a predetermined event in a series of events constituting the macro event. Consequently, it is possible to easily obtain a flexible image of the macro event.

Further, an image in a predetermined portion of the image of the macro event is selected and the image of the macro event is summarized at the image summarizing step, the image recording step recording the image of the macro event summarized at the image summarizing step. Consequently, the recording capacity of the image recording unit can be reduced so that monitoring for a longer time can be carried out.

Further, at the image summarizing step, an image in a predetermined portion of the image of the macro event is selected and a static image is periodically acquired from a non-selected image of the macro event and the selected image is connected with the static image on a time basis, thereby summarizing the image of the macro event, the image recording step recording the image of the macro event summarized at the image summarizing step. Consequently, the non-selected image portion with the summary can be complemented efficiently. Furthermore, the recording capacity of the image recording unit can be reduced so that monitoring for a longer time can be carried out.

Further, data related to the image is measured at the measuring step, and the measured data acquired at the measuring step is stored in relation to the macro event at the data storing step, the displaying step displaying the image of the macro event and displaying the measured data related to the macro event. Consequently, it is easy to understand the contents of the event image or the macro event image. In particular, in the case in which the image acquisition unit is to be acquired by movement, the position information is set to the measurement data so that it is easy to understand the contents of the event image or the macro event image.

Further, the image recording step selects one of the images corresponding to the image of the macro event from a plurality of input images and records the selected image as the image of the macro event. Consequently, also in the case in which a plurality of images are to be acquired at the same time, it is easy to obtain the macro event image.

Further, at the analyzing step, an analysis processing such as the analysis of the behavior of a car is carried out based on at least the image of the macro event. Therefore, in the case in which the predetermined analysis processing is to be carried out based on the collected image, it is possible to carry out the analysis processing which is more inclusive and efficient.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image collection apparatus comprising:
   a control unit that controls the operation of a plurality of units comprising the image collection apparatus, the plurality of units including;
   an image acquisition unit which acquires an image;
   an event detection unit which detects an event based on the image;
   an operation unit by which inputted instructions are implemented;
   an event data creation unit which creates event data indicative of at least a generation time and contents of the event detected by said event detection unit;
   a macro event definition unit which defines a macro event, including at least a first event and a last event related to each other, and having a time width, equivalent to an entire range of events between a beginning of the at least first event to an end of the last event, by using the generation time and contents of the event;
   wherein the macro event definition unit carries out definition including repetition of a predetermined event in a series of events constituting the macro event;
   a macro event data creation unit for creating macro event data by structuring the at least first event and the last event from a plurality of event data generated by said event data creation unit based on definition contents of the macro event defined by said macro event definition unit allowing dependent storage and retrieval of the at least first event and the last event;
   an image recording unit which records an image of a macro event corresponding to the macro event data;
   a retrieval unit which retrieves a desirable macro event based on the macro event data; and
   a display unit which acquires at least an image of the macro event retrieved by the retrieval unit from the image recording unit and displays the image;
   an image summary unit which selects an image in a predetermined portion of the image of the macro event and summarizes the image of the macro event;
   wherein said image recording unit records the image of the macro event summarized by said image summary unit;
   a measurement unit which measures data related to the image; and
   a measured data storage unit which stores the measured data acquired by said measurement unit in relation to the macro event,
   wherein said display unit displays the image of the macro event and displays the measured data related to the macro event.

2. The image collection apparatus according to claim 1, further comprising a temporary storage unit which temporarily stores the image acquired by said image acquisition unit,
   wherein said image recording unit extracts and records an image related to an event detected by said event detection unit from the image temporarily stored by said temporary storage unit.

3. The image collection apparatus according to claim 1, further comprising an image summary unit which selects an image in a predetermined portion of the image of the macro event, periodically acquires a static image from a non-selected image of the macro event and connects the selected image with the static image on a time basis, thereby summarizing the image of the macro event, said image recording unit recording the image of the macro event summarized by said image summary unit.

4. The image collection apparatus according to claim 1, further comprising a plurality of image acquisition devices,
   wherein said image recording unit selects one of said image acquisition units corresponding to the image of the macro event from a plurality of images input from said image acquisition units and records, as the image of the macro event, the image input from said selected image acquisition unit.

5. The image collection apparatus according to claim 1, further comprising an analysis unit which carries out a predetermined analysis processing based on at least the image of the macro event.

6. An image collection method comprising:
   controlling a plurality of operations, including
   acquiring an image and detecting an event;
   implementing inputted instructions;
   creating event data indicative of at least a generation time and contents of the event detected by said acquiring;

creating macro event data by structuring at least a first event and a last event related to each other from a plurality of event data generated by said event data generation unit and having a time width, equivalent to an entire range of events between a beginning of the at least first event to an end of the last event, allowing dependent storage and retrieval of the at least first event and the last event;

wherein said creating includes creating macro event data based on the macro event definition contents defined including repetition of a predetermined event in a series of event constituting the macro event' recording an image of a macro event corresponding to the macro event data;

retrieving a desirable macro event based on the macro event data;

acquiring and displaying at least the image of the macro event retrieved at the retrieving;

selecting an image in a predetermined portion of the image of the macro event and summarizing the image of the macro event, said image recording including recording the image of the macro event summarized at said image summarizing;

measuring data related to the image;

storing the measured data acquired at said measuring step in relation to the macro event; and said displaying including displaying the image of the macro event and displaying the measured data related to the macro event.

7. The image collection method according to claim 6, further comprising temporarily storing the image acquired at said acquiring, wherein in said image recording an image related to an event detected at said acquiring is extracted from the image temporarily stored at said temporary storing and recorded.

8. The image collection method according to claim 6, further comprising selecting an image in a predetermined portion of the image of the macro event, periodically acquiring a static image from a non-selected image of the macro event and connecting the selected image with the static image on a time basis, to summarize the image of the macro event, said image recording including recording the image of the macro event summarized at said image summarizing.

9. The image collection method according to claim 6, wherein said image recording selects one of the images corresponding to the image of the macro event from a plurality of input images and records the selected image as the image of the macro event.

10. The image collection method according to claim 6, further comprising carrying out a predetermined analysis processing based on at least the image of the macro event.

* * * * *